(12) United States Patent
Canchi et al.

(10) Patent No.: US 8,908,312 B2
(45) Date of Patent: Dec. 9, 2014

(54) DYNAMIC FLY HEIGHT CONTROL THAT IS INSENSITIVE TO OFF-TRACK MOTION

(71) Applicant: HGST Netherlands B.V., Amsterdam (NL)

(72) Inventors: Sripathi V. Canchi, Santa Clara, CA (US); Michael K. Grobis, San Jose, CA (US); Bruno Marchon, Palo Alto, CA (US); Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 43 days.

(21) Appl. No.: 13/681,218

(22) Filed: Nov. 19, 2012

(65) Prior Publication Data

US 2014/0139945 A1    May 22, 2014

(51) Int. Cl.
*G11B 5/60* (2006.01)
*G11B 21/21* (2006.01)

(52) U.S. Cl.
CPC .............. *G11B 21/21* (2013.01); *G11B 5/6029* (2013.01); *G11B 5/607* (2013.01)
USPC ............... 360/55; 360/31; 360/294; 360/135; 360/75

(58) Field of Classification Search
None
See application file for complete search history.

(56) References Cited

U.S. PATENT DOCUMENTS

| | | | |
|---|---|---|---|
| 6,249,393 B1 | 6/2001 | Billings et al. | |
| 6,288,856 B1 | 9/2001 | Ottesen et al. | |
| 6,459,539 B1 | 10/2002 | Carlson et al. | |
| 6,466,409 B1 | 10/2002 | Baba et al. | |
| 7,626,779 B2 | 12/2009 | Kuwahara | |
| 7,715,135 B1 | 5/2010 | Sutardja et al. | |
| 7,830,634 B2 | 11/2010 | Chen et al. | |
| 7,839,595 B1 | 11/2010 | Chue et al. | |
| 7,986,487 B1 * | 7/2011 | Madden et al. | 360/75 |
| 8,649,119 B2 * | 2/2014 | Marchon et al. | 360/31 |
| 2006/0044658 A1 | 3/2006 | Ma | |
| 2008/0225427 A1 | 9/2008 | Liu | |
| 2009/0195912 A1 | 8/2009 | Sato | |
| 2010/0128399 A1 | 5/2010 | Che et al. | |
| 2010/0208387 A1 | 8/2010 | Ehrlich | |

OTHER PUBLICATIONS

Tang et al, "Overview of Fly Height Control Applications in Perpendicular Magnetic Recording", IEEE Transactions on Magnetics, vol. 43, No. 2, Feb. 2007, pp. 709-714.

(Continued)

*Primary Examiner* — Wayne Young
*Assistant Examiner* — Brian Butcher

(57) ABSTRACT

A data storage device and method for enabling dynamic fly height control which is insensitive to off-track motions is described. In some embodiments, a hard disk drive acquires signal data from neighboring overlapping tracks which are unwritten, thermally erased, or AC demagnetized. Side-to-side (off-track) positional errors or oscillations of the read head do not affect the signal which arises solely from the magnetic domains on the disk. Thus, signal variations may only arise from changes in the fly height. In other embodiments, neighboring overlapping data tracks are prewritten with reference data. The width of the neighboring overlapping tracks exceeds any expected side-to-side positional errors of the read head, thus signal variations may only arise from changes in the fly height. For all embodiments, the noise or reference data signal may serve as a reliable dynamic measure of the fly height with no effects arising from off-track motions.

22 Claims, 19 Drawing Sheets

(56) References Cited

OTHER PUBLICATIONS

R.L. Wallace, Jr., "The Reproduction of Magnetically Recorded Signals", The Bell System Technical Journal, Vo. 30, Oct. 1951, pp. 1145-1173.

Shi et al, Use of Readback Signal Modulation to Measure Head/Disk Spacing Variations in Magnetic Disk Files, IEEE Transactions on Magnetics, vol. MAG-23, No. 1, Jan. 1987, pp. 233-240.

Liu et al, "Tibo-Magnetics and Nanometer Spaced Head-Disk Systems", IEEE Transactions on Magnetics, vol. 37, No. 2, Mar. 2011, pp. 918-923.

Yuan et al, "Absolute Head Media Spacing Measurement In Situ", IEEE Transactions on Magnetics, vol. 42, No. 2, Feb. 2006, pp. 341-343.

Xu et al, "Head-Medium Spacing Measurement Using the Read-Back Signal", IEEE Transactions on Magnetics, vol. 42, No. 10, Oct. 2006, pp. 2486-2488.

Shimizu et al, "Two-Dimensional Flying-Height Modulation Mapping at HDD Drive Level", IEEE Transactions on Magnetics, vol. 42., No. 10, Oct. 2006, pp. 2516-2518.

Gebredingle et al, "The Magnetic Spacing Sensitivity of Perpendicular Recording", IEEE Transactions on Magnetics, vol. 42, No. 10, Oct. 2006, pp. 2273-2275.

Boettcher et al, "Servo Signal Processing for Flying Height Control in Hard Disk Drives", Microsyst Technol, vol. 17, Jan. 2011, pp. 937-944.

Schardt et al, "Fly-Height Measurement While Seeking in Hard Drives".

\* cited by examiner

DYNAMIC FLY HEIGHT CONTROL THAT IS INSENSITIVE TO OFF-TRACK MOTION

TECHNICAL FIELD

The present invention relates to data storage devices, and in particular to data storage devices with rotating disks above which read/write heads fly with a small head-to-disk clearance ("fly height") that may be controlled to preserve the integrity of the read/write process.

BACKGROUND

Data storage devices employ rotating data storage media such as hard disk drives. In a hard drive, data is written to the disk medium using a write head which generates a highly localized magnetic field which aligns magnetic domains within the disk in one of two directions, wherein one direction represents a "1" and the other direction represents a "0". In some cases, the magnetization direction is up or down relative to the plane of the disk (perpendicular magnetic recording, or PMR). In other cases, the magnetization direction is within the plane of the disk. In all cases, this data may then be read-out with a read head. The write and read heads are typically integrated within a single assembly as shown in FIG. 21. To achieve steadily increasing data storage densities (typically measured in bits/inch$^2$), which are now achieving levels near $10^{12}$ bits/in$^2$, the sizes of magnetic regions storing individual bits have been reduced to nm levels. Writing to, and reading from, such small regions may include shrinking the sizes of the read and write heads and also having them "fly" closer to the disk surface (since the magnetic forces drop rapidly with increasing distance between the disk and the head). The distance between the head and the disk is called the "fly height" since the head is said to "fly" above the disk on a cushion of compressed air which is entrained by the rapid rotation of the disk and then squeezed between the head (often called a "sled") and the disk. Very precise control of the fly height is achieved using "thermal fly height control" (TFC) which employs an electrical heater (with mW powers) to heat the pole pieces of the head, resulting in nm-level thermal expansion which pushes the pole pieces slightly closer to the spinning disk surface.

Precise control of the TFC power may include accurate and repeating time measurements of the fly height. For disk drives having multiple disks, and having multiple read/write heads (at least one for each disk surface), independent control of the TFC power to each head is typically employed since fly height variations may be uncorrelated between heads in the drive. Various methods for obtaining this fly height data at selected levels of precision and rapidity have been used, including the use of reference data tracks (with, for example, pure 140 MHz-written data), or using user data stored on the drive. An example of such a control method is described in U.S. patent application Ser. No. 13/211,593 which is incorporated in its entirety by reference herein. In all these methods, standard width data tracks were used, over which the read head may fly with an alignment (also called tracking) controlled by electronics within the disk drive. In particular, immediately following a seek operation in which the head is rapidly swept radially across a portion of the disk radius, the head may tend to oscillate from side-to-side (i.e., radially) relative to the data track for a period of time following the conclusion of the seek operation. This oscillation may result in the read head moving partially off the edges of the data track, with the result that the read signal (also called the readback signal, or read-out signal) is somewhat attenuated.

In most cases, automatic gain control is capable of adjusting for these read signal fluctuations as far as data acquisition. A goal of some embodiments, however, is to employ this read signal to determine the fly height of the head, for which these read signal fluctuations may induce errors in the height measurement. This may occur because there are two motions which can cause read signal changes: side-to-side head motion (partially on and off the data track), and up-and-down motions corresponding to fly height variations. In a situation where both these effects may occur, separately, or together, it may be impossible to separate the effects of these two motions on the read signal intensity in order to obtain the desired fly height variation information.

A goal of some embodiments is to provide a method and structure for obtaining essentially unambiguous fly height information from the read-out signal, without interference from side-to-side head motions relative to the data track.

A further goal of some embodiments is to provide neighboring data tracks which overlap and are written with known reference data to provide a signal for use in controlling the fly height by means of thermal fly height control (TFC).

A still further goal of some embodiments is to use neighboring data tracks which overlap and are either unwritten, thermally erased, or AC demagnetized to provide a signal for use in controlling the fly height by means of thermal fly height control (TFC).

SUMMARY

Aspects of some embodiments provide a method for improved data storage in a hard disk drive or other data storage device employing a rotating disk. In some embodiments, neighboring data tracks or sectors which have not been written, or which have been thermally erased or AC demagnetized, are read to acquire noise data. This noise data may then be processed to obtain power spectra. These power spectra may be used to obtain precise information about the fly height of the head, which then may be employed to perform thermal fly height control (TFC) more accurately without interference from variations in read head alignment on the data track (i.e., under the loss of proper tracking) since the noise signal is independent of the side-to-side head position above an unwritten region of the disk, and hence only varies with the fly height in a predictable way.

In some embodiments, multiple neighboring overlapping tracks or sectors may be written with the same known reference signal. These overlapping tracks span a radial distance larger than the read head width so that during a read operation from these overlapping tracks, there is minimal or no interference from read head side-to-side positional variations for which the head remains over the neighboring overlapping tracks or sectors.

DETAILED DESCRIPTION

Embodiments can provide one or more advantages over previous methods for dynamically controlling the fly height of read/write heads with respect to disk storage media. Not all embodiments may provide all the benefits. The embodiments will be described with respect to these benefits, but these embodiments are not intended to limit the scope of the invention. Various modifications, alternatives, and equivalents fall within the spirit and scope of the invention as described in the embodiments below and as defined in the claims.

Figure 1:
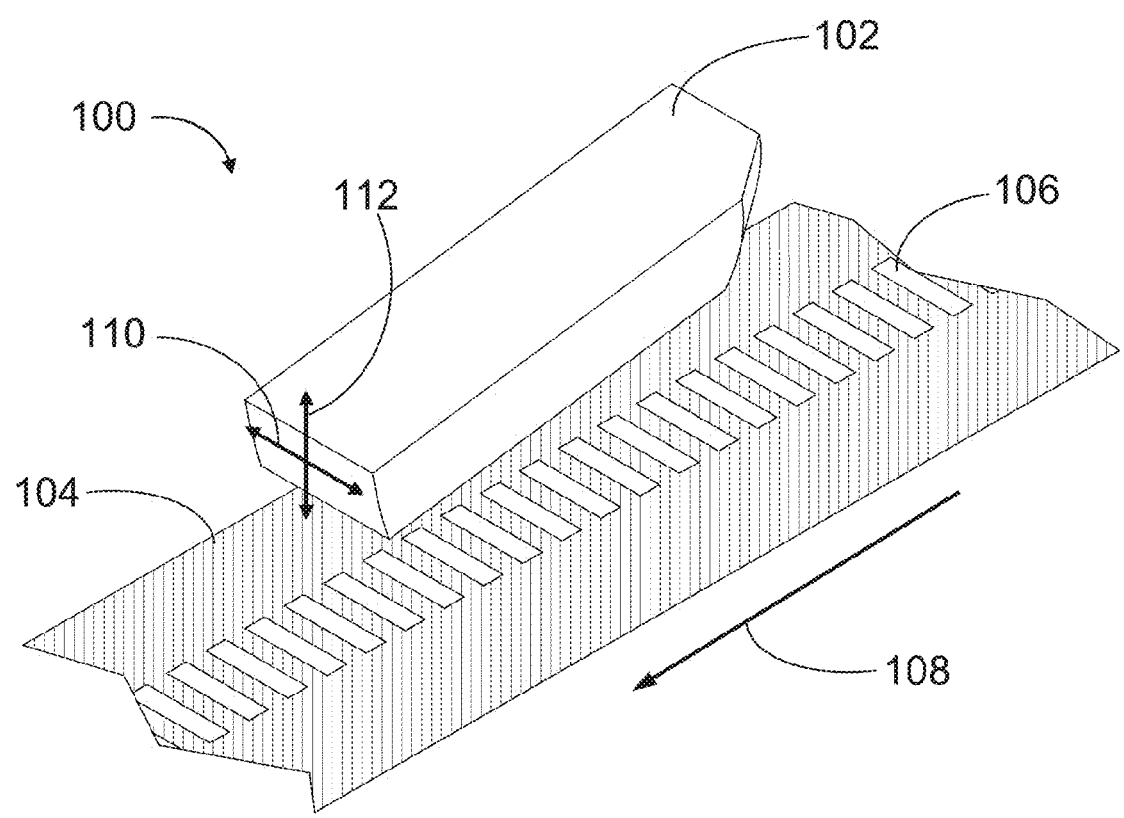
FIG. 1 is a schematic isometric diagram of a read/write head flying above a moving disk which has written data.

FIG. 1 is a schematic isometric diagram 100 of a read/write head 102 flying above a disk 104 moving in a direction 108. Some magnetized bits on the data track (each typically comprising a multiplicity of magnetic domains) are illustrated as clear rectangles 106. The read/write head 102 "flies" above the disk medium 104 typically at a distance of roughly ten nanometers. Aerodynamic effects between the lower surface of the head 102 and the upper surface of the disk 104 aid in maintaining this distance, termed the "fly height". Magnetic pole pieces in the lower surface of the head 102 detect magnetic transitions in the disk 104 such as bits 106. There are three possible relative motions of the head 102 with respect to the disk 104: 1) rotation of the disk 104 (arrow 108), 2) vertical motions corresponding to changes in the fly height (arrow 112), and 3) side-to-side motions of the head 102 relative to the data track represented by regions 106 (arrow 110). The head fly height affects the detected signal strength: increased fly height decreases the signal, while decreased fly height increases the signal while also increasing the probability of mechanical contact between the head 102 and the disk 104, potentially resulting in physical damage to disk 104 (a "head crash"). Thus it is desirable to maintain the fly height relatively stable during disk drive operation. Side-to-side motion of the read head may also affect the signal strength if the head moves partially off the data track to either side. The slider 102 commonly is found to oscillate with side-to-side motions following a seek operation in which the read head is slewed along the direction of arrow 110 to sequentially address various data tracks on disk 104. At present, long averaging times of the signal (substantially exceeding the mechanical oscillation period of head 102 along arrow 110) are employed to filter out signal variations arising from side-to-side motions. In normal operation of a disk drive while accessing written data, variations in the signal intensity may be tolerated, whether caused by fly height variations and/or side-to-side motions of the read head with respect to the center of the data track. Automatic gain control is an accepted methodology for compensating these effects. For the purposes of some embodiments, however, it is preferred to differentiate signal intensity variations arising from side-to-side head motions from signal intensity variations arising from fly height variations.

Figure 2:
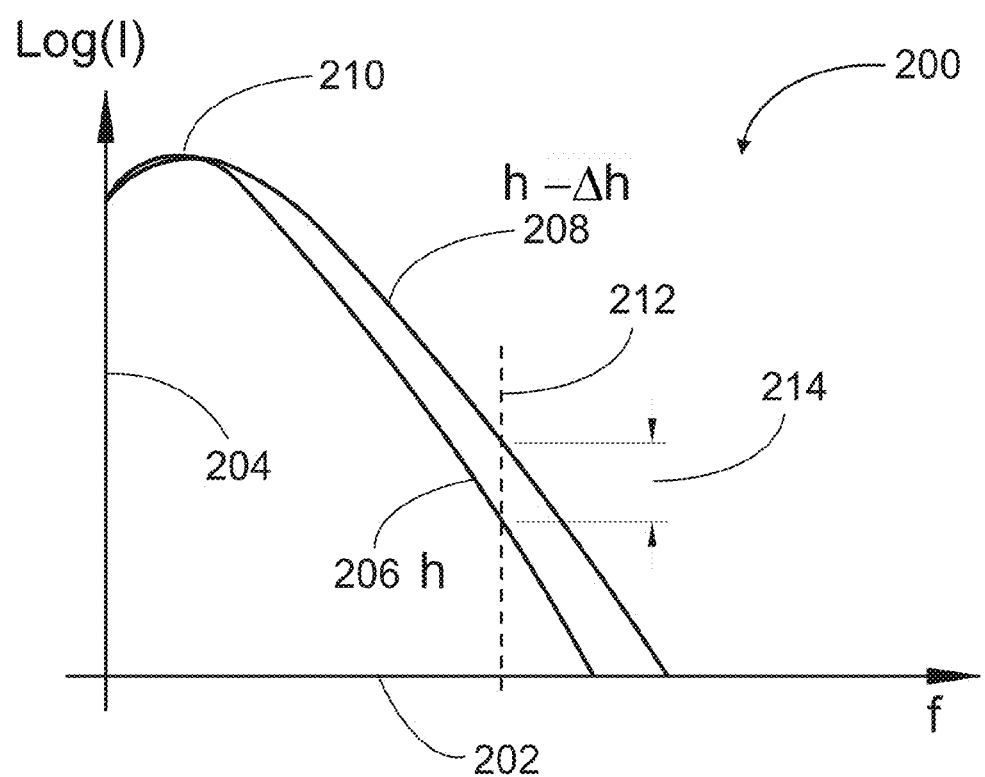
FIG. 2 is a graph of the logarithm of the signal intensity as a function of the signal frequency.

FIG. 2 is a graph 200 of the logarithm 204 of the signal intensity as a function of the signal frequency 202, illustrating the functional relationship commonly known as the "Wallace equation":

$$I(f)=\alpha(f)\exp[-2\pi f h] \quad [eq. 1]$$

where
I(f)=the signal intensity at a frequency f,
α(f)=the power spectrum of the signal from the read head,
f=the frequency component of the signal,
h=HMS, the head medium spacing or fly height of the head above the disk.

Taking the logarithm of equation 1 gives:

$$\text{Log }[I(f)]=\text{Log }[\alpha(f)]-2\pi f h. \quad [eq. 2]$$

Depending on the behavior of α(f) with f, it can be seen that Log [I(f)] may exhibit two different regimes of behavior, corresponding to the functional variation in [α(f)] combined with an overall downward-sloping line corresponding to the negative linear term in f (having a slope=−2 πh):

1) A lower-frequency region 210 in which Log(I) is high and increases with f, or is relatively independent of f: these frequencies correspond to magnetic regions which are physically larger on the disk and thus couple approximately as well for HMS values of h (curve 206) and h−Δh (curve 208); and 2) A higher-frequency region including dashed line 212 in which Log(I) is still appreciable in magnitude, but decreases with f: these signals correspond to magnetic domains over a physical size range such that a variation in HMS by Δh has a much larger effect on the magnetic coupling between the disk and the head than for region 210, thereby modulating the signal intensity with changes in h and causing curves 206 (HMS=h) and curve 208 (HMS=h−Δh) to separate by an amount 214 at line 212, as shown.

Curve 206 corresponds to the log(I) for a fly height (head medium spacing, HMS) of h, while curve 208 corresponds to the slightly higher signal intensity corresponding to a reduced HMS of h−Δh. As expected, the signal increases as the head-disk spacing is reduced since the magnetic coupling between domains on the disk and the read head is strengthened as the reluctance of the gap is reduced.

Figure 3:
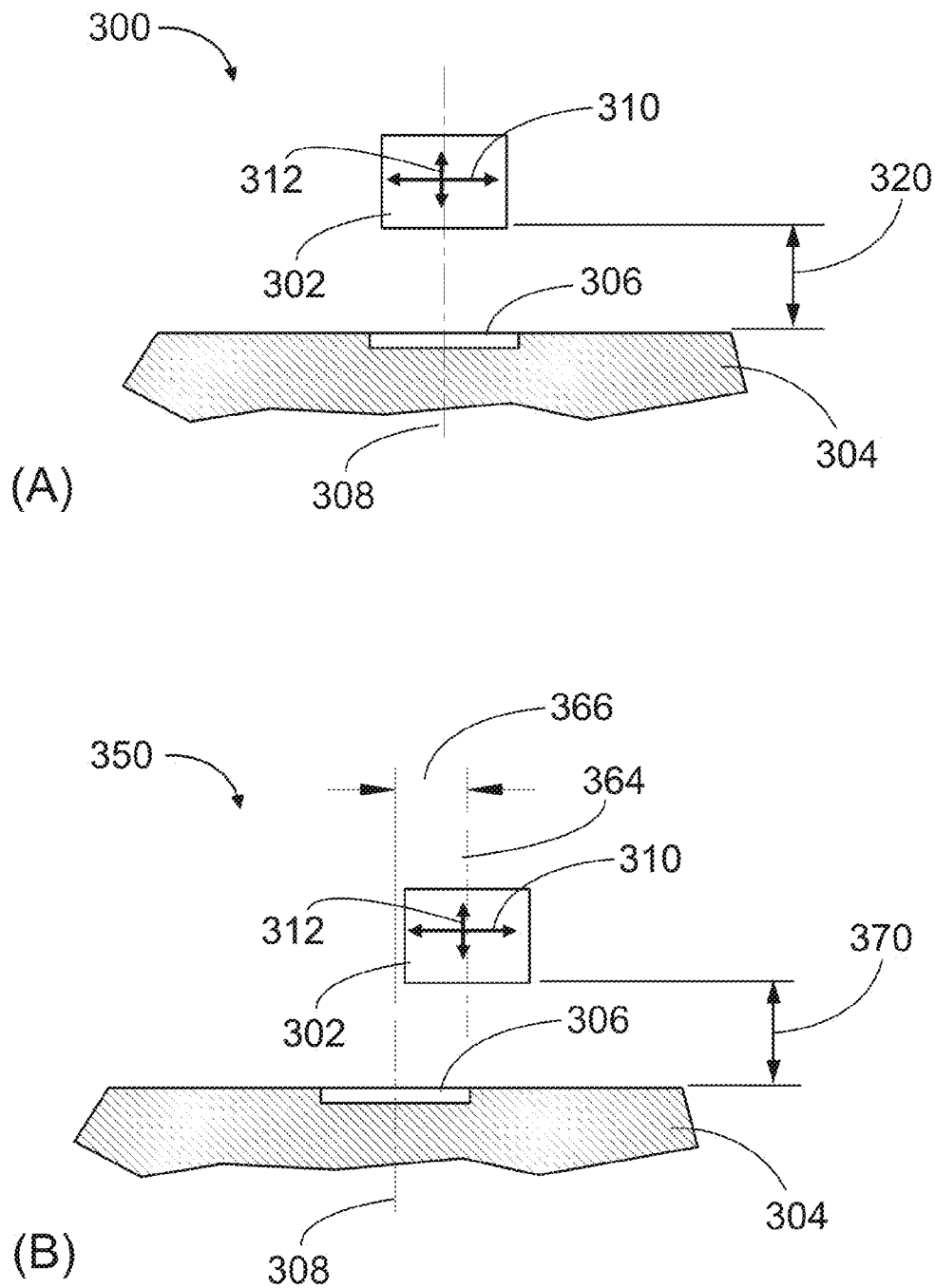
FIG. 3 is a schematic front view diagram of a read head flying above a disk.

View (A) of FIG. 3 is a schematic front view diagram 300 of a read head 302 flying above a disk 304 with a head medium spacing 320 and aligned with the centerline 308 of a data track 306 containing reference data comprising single, dual, or multiple frequencies. The width of the data track typically corresponds roughly to the width of the write head used to write the data track. The pole pieces within the read head may typically be somewhat narrower radially (left-to-right in FIG. 3) than the width of the write head. As discussed in FIG. 1, various relative motions between the head and disk are possible: 1) vertical motion (arrow 312) which changes the HMS with the signal intensity effects shown in FIG. 2, and 2) side-to-side motion (arrow 310). In View (A), read head 302 is completely over the data track 306, so both the magnetic coupling efficiency and the signal intensity are maximized for this particular HMS 320. Motion along axis 312 will change the signal intensity as discussed in FIG. 2.

View (B) of FIG. 3 is a schematic front view diagram 350 of the same read head 302 from View (A), but now flying offset a distance 366 from the centerline 308 of the data track 306. The centerline of head 302 is on axis 364. In this case, the offset 366 of head 302 is large enough that a portion of head 302 is no longer above data track 306 as shown, thus both the magnetic coupling efficiency and the signal intensity are reduced (compared with View (A)) even in the case where HMS 320 is the same as HMS 370. Motion along axis 312 will change the signal intensity as discussed in FIG. 2. In general, there is no way to distinguish between signal variations induced by motion along axis 312 (HMS variations) and motion along axis 310 which is large enough to move the read head partially off the data track.

Figure 4:
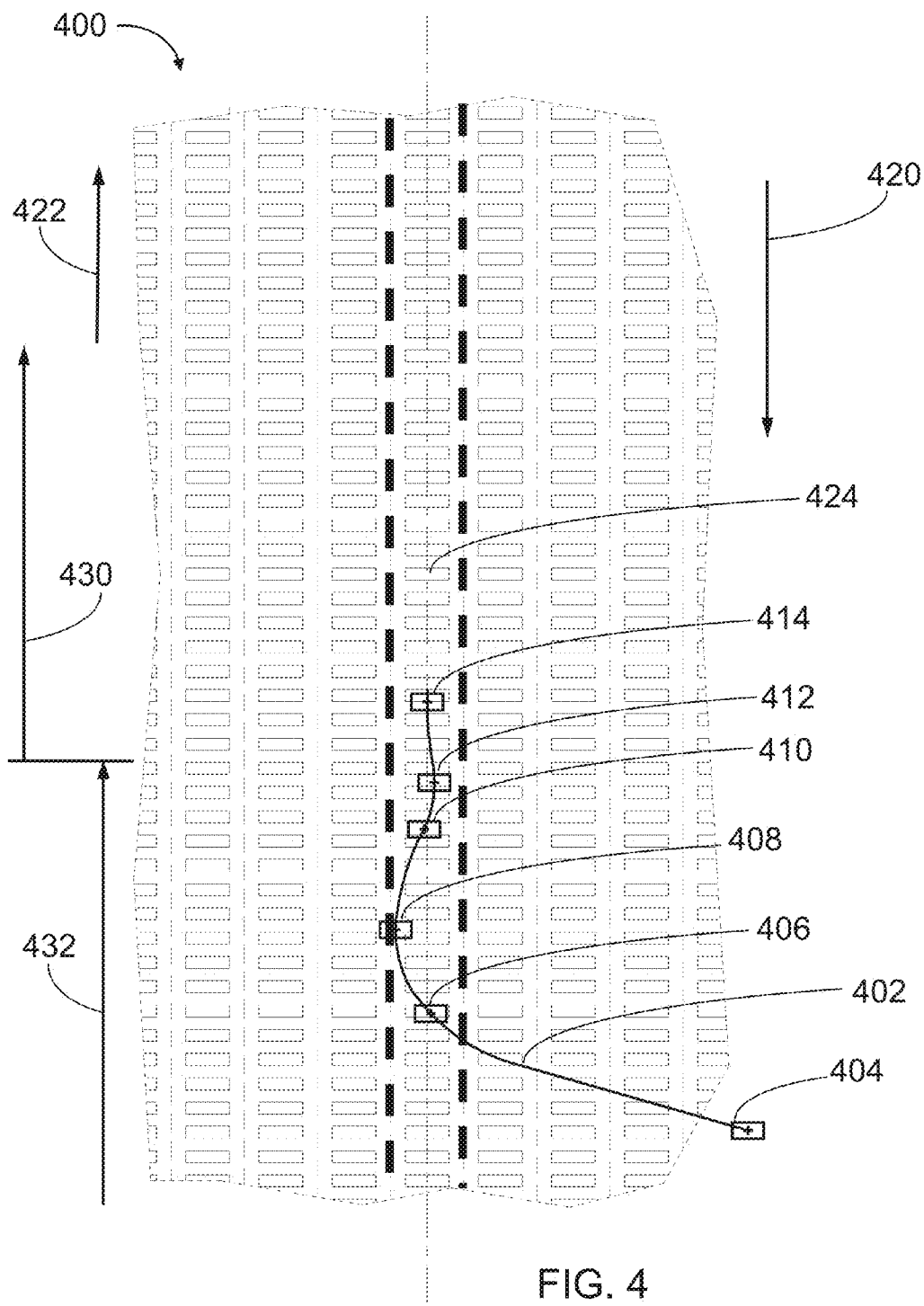
FIG. 4 is a schematic top view diagram of a read head flying above a disk.

FIG. 4 is a schematic top view diagram 400 of the trajectory 402 of a read head above a data track 424 (bordered by two heavy dashed lines) containing reference data comprising single, dual, or multiple frequencies. Along trajectory 402, various positions (at succeeding times) 404, 406, 408, 410, 412, and 414 of the read head are shown. Arrow 420 illustrates the direction of disk motion relative to the read head. Arrow 422 illustrates the effective direction of time along trajectory 402. Head position 404 corresponds to the head as it approaches track 424 towards the end of a "seek" operation. Position 406 is completely over track 424, while position 408 (a short period later) is off the left edge of the data in track 424. At position 410 the head is again over track 424, while at position 412 (a short period later), the head is again off the edge of the data, in this case to the right. Finally at position 414 and thereafter (times represented by arrow 430) until another seek operation is initiated, the head will remain within the width of the written data on track 424 in the absence of track misregistration errors (in other words under precise tracking of the data track by the head). Arrow 432 represents times for which the read head may be far enough off the centerline of track 424 that the edge of the head may extend beyond the written data, as illustrated in View (B) of FIG. 3. Arrow 430 shows times for which the read head will remain within the written data, as illustrated in View (A) of FIG. 3. Note that for a substantial period of time after the seek operation is nominally completed, the head may intermittently be far enough off the centerline of track 424 to induce some signal loss which may interfere with measurements of the head mean spacing.

Figure 5:
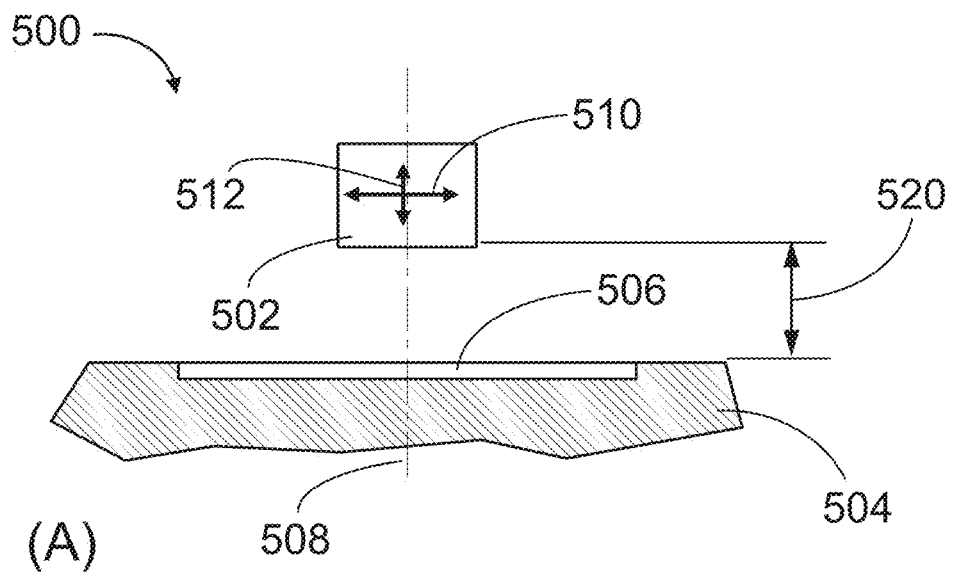
FIG. 5 is a schematic front view diagram of a read head flying above a disk with written data according to some embodiments.
Figure 5:
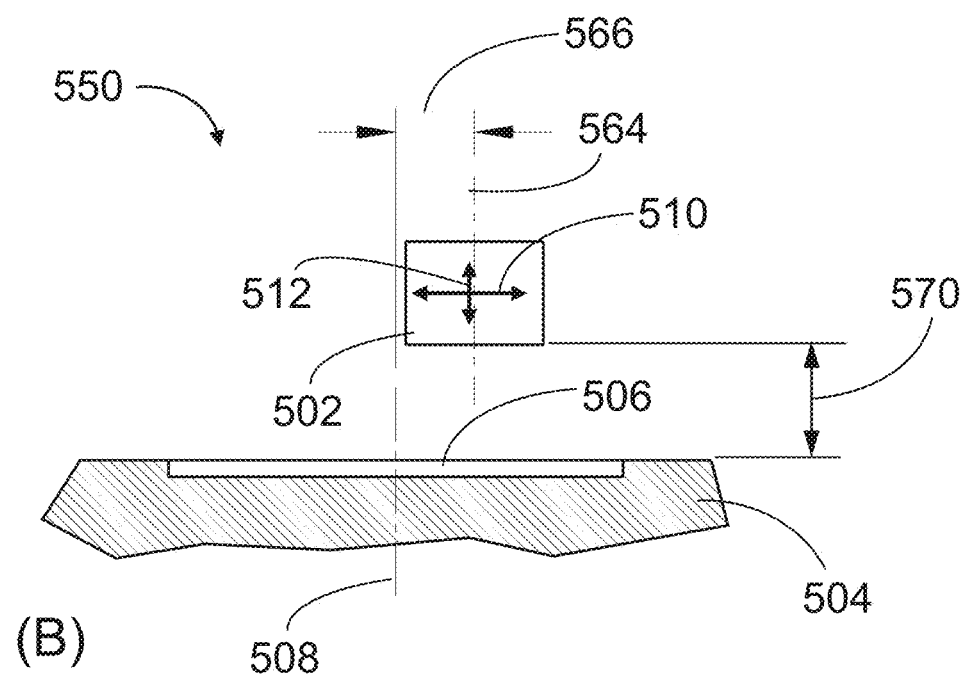
Figure 6:
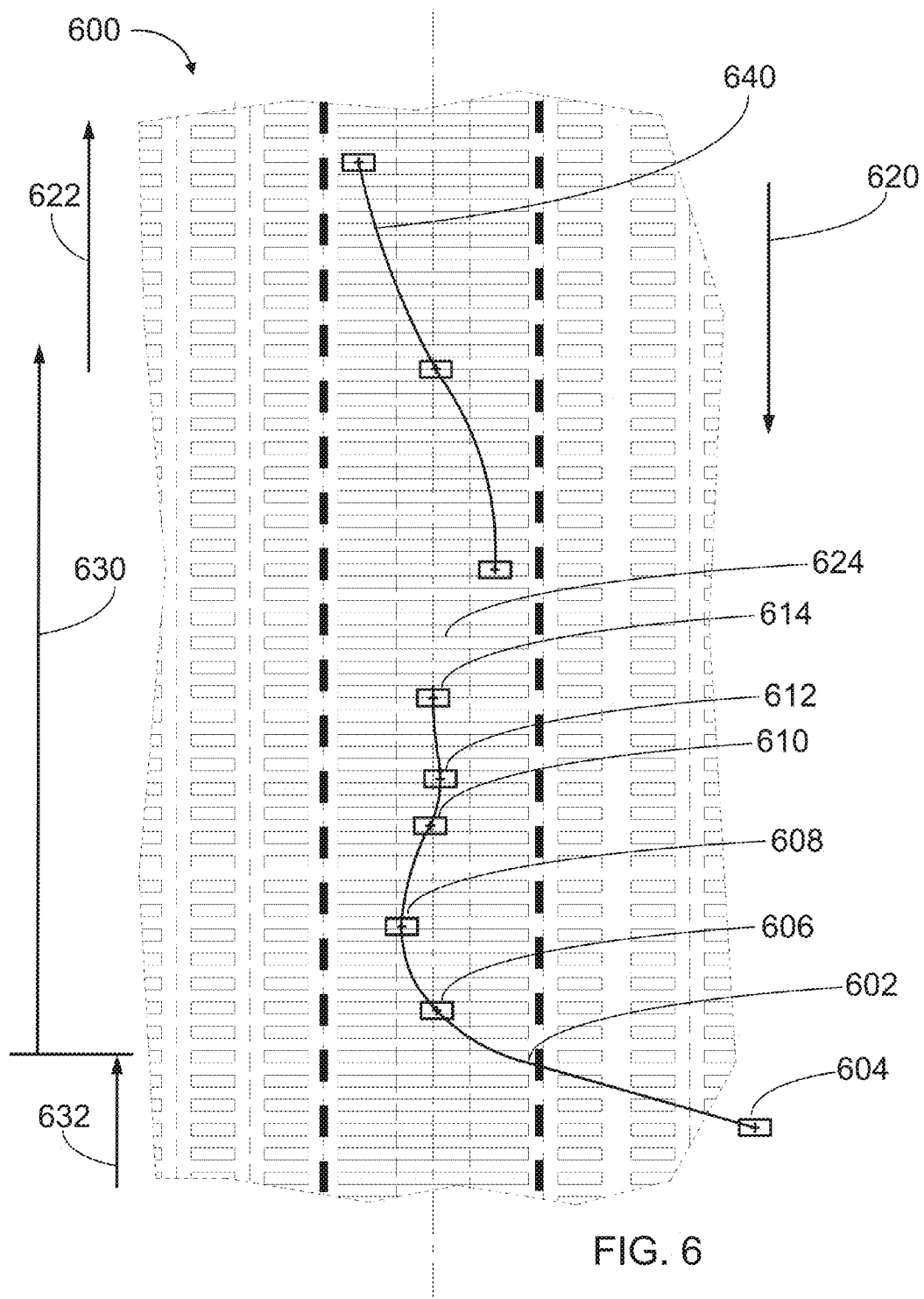
FIG. 6 is a schematic top view diagram of a read head flying above a disk with written data according to some embodiments.

Embodiments Employing Neighboring Overlapping Data Tracks Comprising Reference Data FIGS. 5 and 6 are front and top view schematic diagrams of a read head flying above a region of the disk containing reference data comprising single, dual, or multiple frequencies.

View (A) of FIG. 5 is a schematic front view diagram 500 of a read head 502 flying above a disk 504 with a medium head spacing 520 and aligned with the centerline 508 of a data track 506 according to some embodiments. Track 506 comprises neighboring overlapping tracks as shown in FIG. 6. The overlapping tracks 506 may be written by various methods including, but not restricted to: 1) microjogging the write head across the disk to write the same reference signal (with single, dual, or multiple frequencies) on a multiplicity of neighboring tracks without unwritten transitions between tracks, and 2) using a shingled writing method (SMR) to write the reference data (with single, dual, or multiple frequencies) over a band corresponding in width to multiple neighboring data tracks. Note that the width of the neighboring overlapping data tracks 506 is much wider than the width of the read head 502 for this embodiment. Variations in the HMS 520 along arrow 512 will still have an effect on the signal intensity (see FIG. 2), however side-to-side displacements along arrow 510 should have minimal or no effects on the signal intensity as long as these displacements are small enough to maintain head 502 above neighboring overlapping data tracks 506.

View (B) of FIG. 5 is a schematic front view diagram 550 of the same read head 502 from View (B), but now flying offset a distance 566 from the centerline 508 of neighboring overlapping data tracks 506 according to some embodiments. Note that since overlapping tracks 506 may be as much as three or more times as wide as data track 306 in FIG. 3, read head 502 does not extend off the edge of tracks 506 the way head 302 extended beyond the edge of track 306 in View (B) of FIG. 3. Thus, there should be no loss in signal intensity between the head positions with zero offset (View A) and an offset 566 (View B) where HMS 520 is the same as HMS 570.

FIG. 6 is a schematic top view diagram 600 of the trajectory 602 of a read head above neighboring overlapping data tracks 624 (bordered by two heavy dashed lines) containing reference data comprising single, dual, or multiple frequencies. Along trajectory 602, various positions (at succeeding times) 604, 606, 608, 610, 612, and 614 (corresponding to times 404, 406, 408, 410, 412, and 414 in FIG. 4) of the read head are shown. Arrow 620 illustrates the direction of disk motion relative to the read head. Arrow 622 illustrates the effective direction of time along trajectory 602. Head position 604 corresponds to the head as it approaches track 624 towards the end of a "seek" operation. Positions 606, 608, 610, 612, and 614 are all completely over track 624. The head will remain over track 624 thereafter (times represented by arrow 630) until another seek operation is initiated (in the absence of track misregistration errors). Arrow 632 represents times for which the read head may be far enough off the centerline of track 624 that the edge of the head may extend beyond the written data—note that this time is shortened relative to FIG. 4. Arrow 630 shows times for which the read head will remain within the written data, as illustrated in Views (A) and (B) of FIG. 5—note that this period starts earlier with this embodiment, than in FIG. 4. Also shown in FIG. 6 is a trajectory 640 spanning multiple data tracks—this may enable negation of cross-track differences in the readback signal at a fixed radial position (see FIG. 19).

Embodiments Employing Data-Free Neighboring Overlapping Data Tracks

Figure 7:
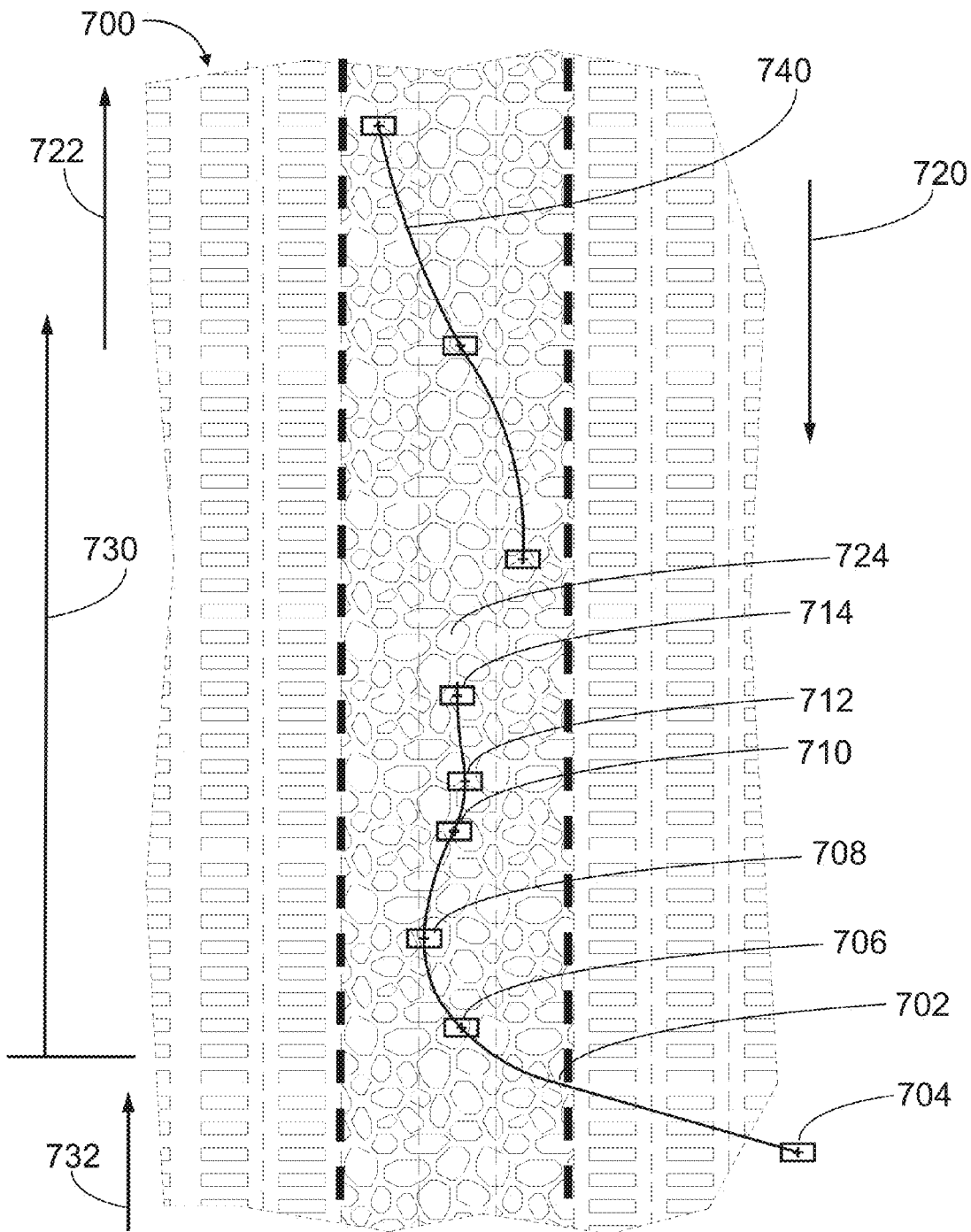
FIG. 7 is a schematic diagram of a read head flying above a region of a data-free region of a disk, according to some embodiments.

FIG. 7 is a schematic top view diagram 700 of the trajectory 702 of a read head flying above neighboring overlapping tracks 714 (bordered by two heavy dashed lines) which do not contain any written data—hereinafter referred to as a "data-free region". A data-free region comprises a plurality of neighboring and overlapping data tracks which do not contain any written data for one or more of the following reasons:
1) the tracks have never been written,
2) the tracks were previously thermally erased by heating the entire disk prior to mounting in a disk drive (this process simultaneously erases the entire disk medium),
3) the tracks were previously thermally erased by local heating using a laser or other local heating device which is typically integrated with the read/write head, or
4) the tracks were erased by AC demagnetization.

For adequate thermal erasing of data, the temperature should be high enough to magnetically disorder the medium—typically this may include temperatures close to the Curie temperature (typically approximately 500° C.) of the magnetic material in the disk. AC demagnetization may be performed by placing the disk in an oscillating external magnetic field and slowing ramping down the magnitude of the oscillations to zero (commonly called "degaussing"). Alternatively, local AC demagnetization may be effected using the write head. Either local or global heating may be employed to enhance the AC demagnetization process. Along trajectory 702, various positions (at succeeding times) 704, 706, 708, 710, 712, and 714 (corresponding to times 604, 606, 608, 610, 612, and 614 in FIG. 6) of the read head are shown. Arrow 720 illustrates the direction of disk motion relative to the read head. Arrow 722 illustrates the effective direction of time along trajectory 702. Head position 704 corresponds to the head as it approaches track 724 towards the end of a "seek" operation. Positions 706, 708, 710, 712, and 714 are all completely over track 724. The head will remain over track 724 thereafter (times represented by arrow 730) until another seek operation is initiated (in the absence of track misregistration errors). Arrow 732 represents times for which the read head may be far enough off the centerline of track 724 that the edge of the head may extend beyond the written data—note that this time is shortened relative to FIG. 4, but may be similar to time 632 in FIG. 6. Arrow 730 shows times for which the read head will remain within the 'data free' track region—note that this period starts earlier with this embodiment, than in FIG. 4, but may be similar to time 630 in FIG. 6. Also shown in FIG. 7 is a trajectory 740 spanning multiple data tracks—this may enable negation of cross-track differences in the readback signal at a fixed radial position (see FIG. 19).

Figure 8:
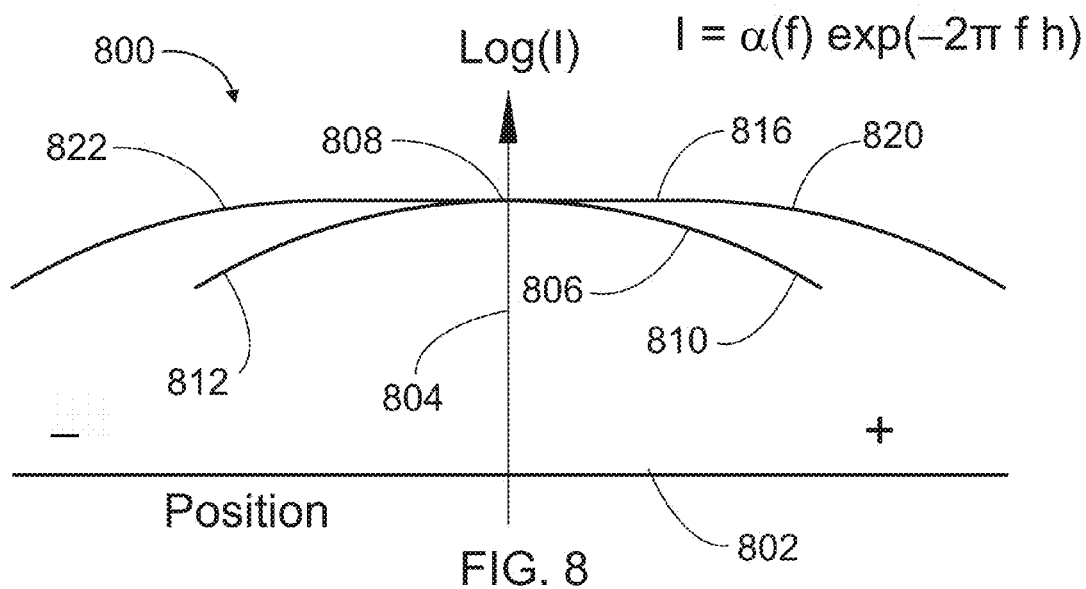
FIG. 8 is a graph of the logarithm of the signal intensity as a function of the position of the read head with respect to the center of a data track and the center of multiple overlapping data tracks.

FIG. 8 is a graph 800 of the logarithm Log(I) 804 of the signal intensity as a function of the position 802 of the read head (+ and −) relative to the centerline of a data track (such as track 306 in FIG. 3) and the center of neighboring overlapping data tracks (such as tracks 602 in FIG. 6). Curve 806 corresponds to the signal intensity for a read head 302 flying above a data track 306 as shown in FIG. 3. When head 302 is centered on data track 306 in View (A) of FIG. 3, the signal intensity 808 is maximized. When head 302 is offset 366 from the centerline 308 of data track 306 as in View (B) of FIG. 3, the intensity drops, as shown at points 810 and 812 on curve 806. As discussed above, some drop in signal intensity is acceptable during data acquisition, however some embodiments employ the signal intensity as an indication of variations in HMS, and thus any signal variation due to side-to-side head position changes could induce an erroneous indication of HMS variations. Curve 816 corresponds to the signal intensity for a read head 502 flying above multiple overlapping data tracks 506 as in View (A) of FIG. 5, according to some embodiments. When head 502 is centered on data track 506 as in View (A) of FIG. 5, the signal intensity is maximized to roughly the same level 808 as in FIG. 3. When head 502 is offset 566 from the centerline 508 of data track 506 as in View (B) of FIG. 5, the intensity does not drop, or drops much less, at points 820 and 822 on curve 816, when compared with points 810 and 812 on curve 806. The benefit of using a wider data track (or neighboring overlapping data tracks) in embodiments is clear from this example. For the example shown in FIG. 7, reading from data-free neighboring overlapping tracks, there should be little or no decrease in the signal intensity in FIG. 8 as a function of position.

Figure 9:
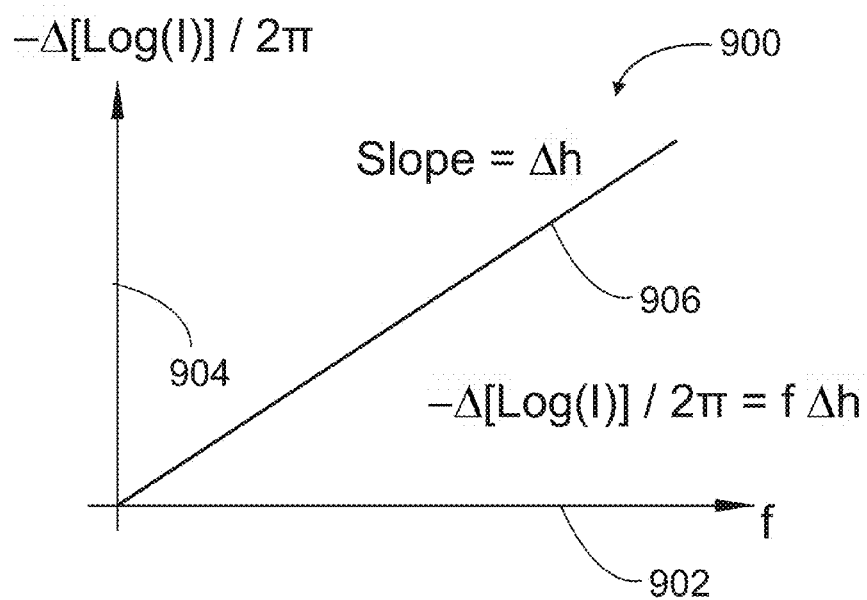
FIG. 9 is a graph of the negative of the differential of the logarithm of the signal intensity as a function of the signal frequency.

FIG. 9 is a graph 900 of the negative of the differential of the logarithm of the signal intensity 904 as a function of the signal frequency 902. Line 906 corresponds to the spacing between curves 206 and 208 at various frequencies in FIG. 2. The slope of line 906 equals Δh (with the $2\pi$ factor moved to the denominator).

Figure 10:
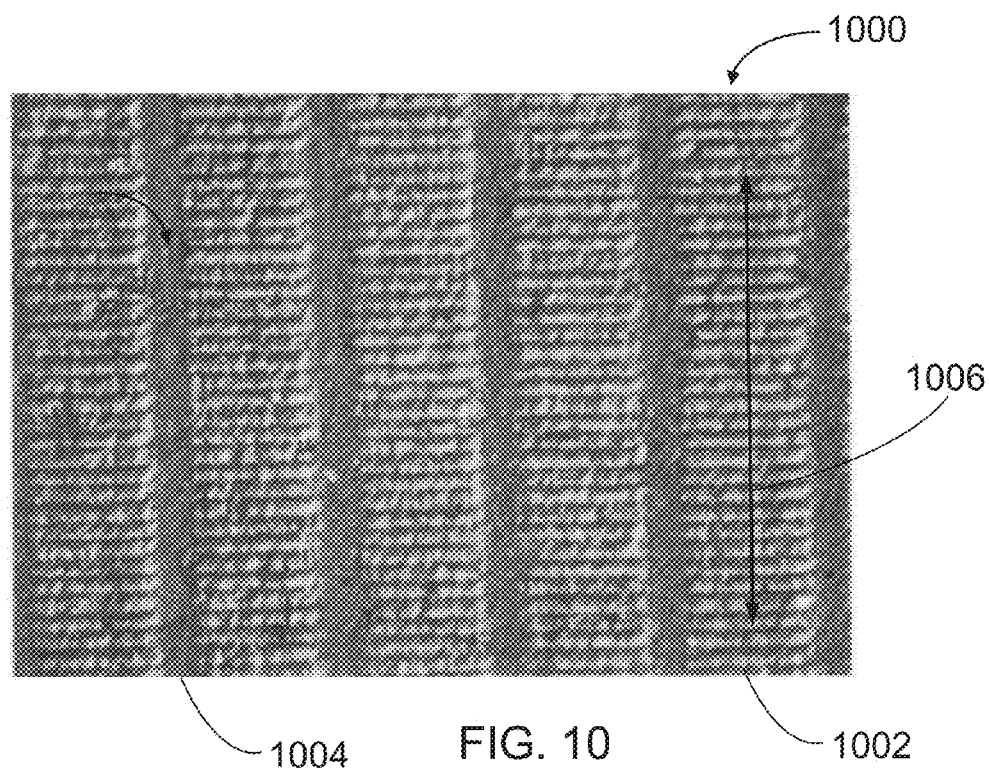
FIG. 10 is a micrograph showing written data on a disk.

FIG. 10 is a micrograph 1000 showing written data 1002 on a disk 1004, which would travel along direction 1006 during read/write operations of a hard disk drive. The graininess arises from the small dimensions of individual magnetic domains compared with the single-bit regions.

Figure 11:
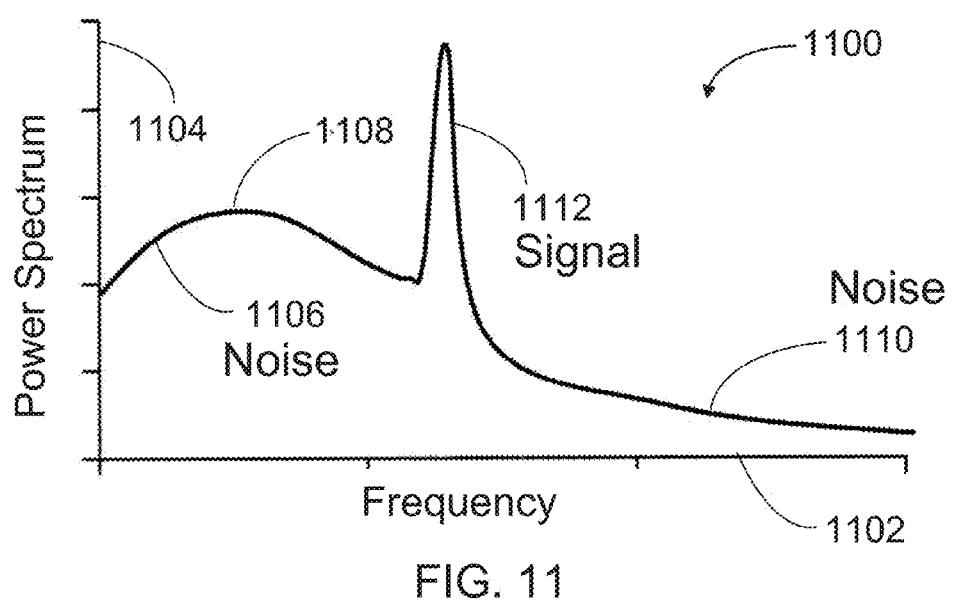
FIG. 11 is a graph of the power spectrum as a function of the signal frequency when reading data such as in FIG. 10 with the read head aligned over the written data track.

FIG. 11 is a graph 1100 of the power spectrum α(f) 1104 as a function of the signal frequency 1102 when reading data such as in FIG. 10. Curve 1108 may be divided into three regions:
1) Region 1106, corresponding to low-frequency noise. This region contains the peak of the power spectrum,
2) Signal peak 1112, arising from the spatial frequency of the bits on the data track (each generally containing a multiplicity of magnetic domains), and
3) Region 1110, corresponding to high-frequency noise. Much less signal power is contained in this region than in region 1106 or signal peak 1112.

Power spectra may typically be obtained using Fast-Fourier Transforms (FFTs) or other calculation methods.

Figure 12:
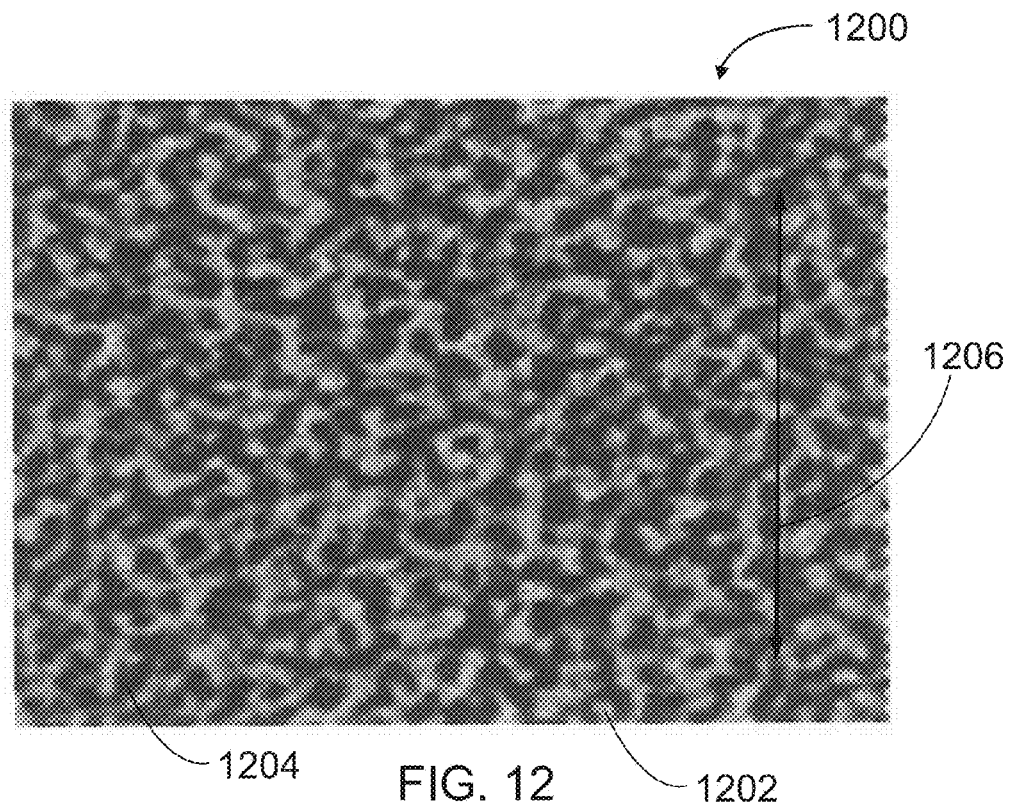
FIG. 12 is a micrograph showing a data-free portion of a disk.

FIG. 12 is a micrograph 1200 showing a portion of a disk 1204 which is data-free (see definition in FIG. 7). Individual magnetic domains are visible as lighter or darker irregular areas. During read/write operations, the disk would travel along direction 1206 relative to the read/write head.

Figure 13:
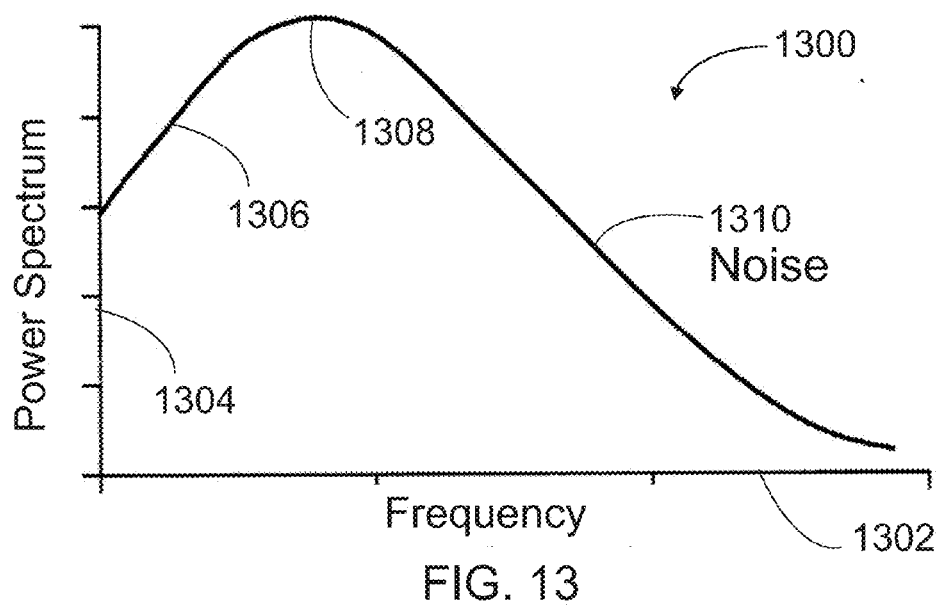
FIG. 13 is a graph of the power spectrum as a function of the signal frequency when reading data such as in FIG. 12.

FIG. 13 is a graph 1300 of the power spectrum α(f) 1304 as a function of the signal frequency 1302 when reading from a region of the disk such as in FIG. 12. Regions 1306 and 1310 of curve 1308 correspond to regions 1106 and 1110 of curve 1108 in FIG. 11, respectively. Note that since there a data-free region of disk 1204, there is no signal peak in FIG. 13 corresponding to signal peak 1112 in FIG. 11.

Figure 14:
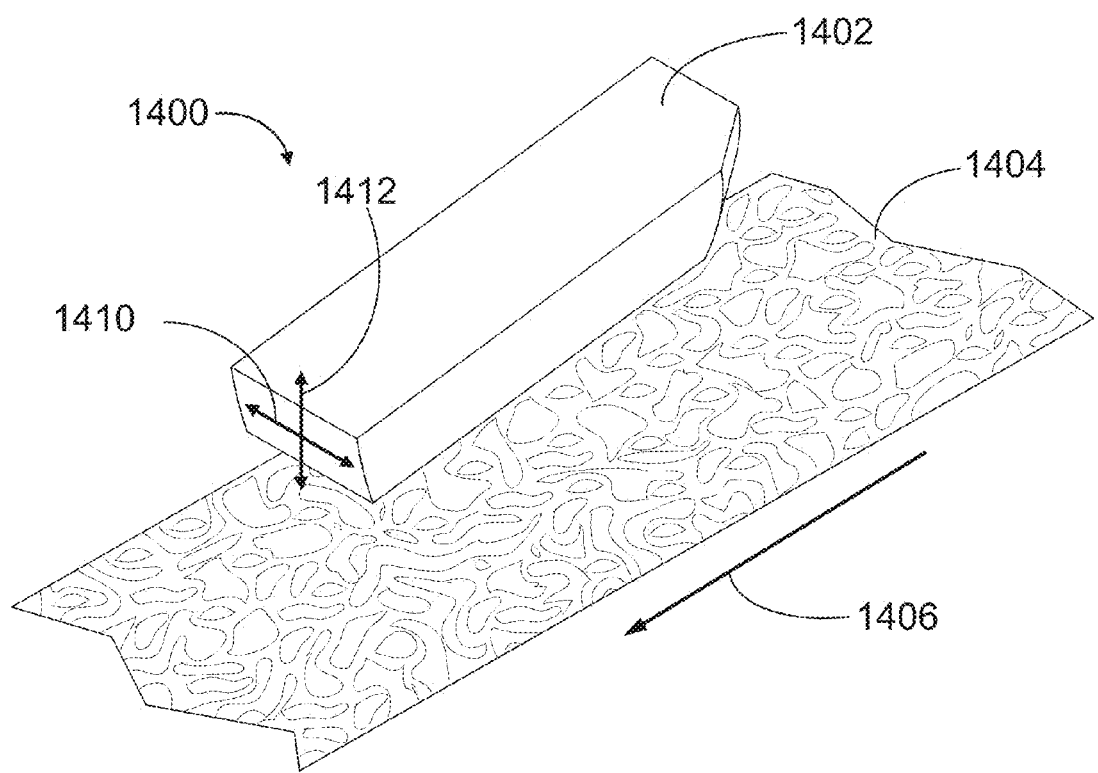
FIG. 14 is a schematic isometric diagram of a read/write head flying above a region of a disk that is data-free.

FIG. 14 is a schematic isometric diagram 1400 of a read/write head 1402 flying above a disk 1404 which is data-free—compare with FIG. 1. As in FIG. 1, there are three possible relative motions of the head 1402 with respect to disk 1404: 1) rotary motion of the disk 1404 (arrow 1406), 2) vertical motions corresponding to changes in the fly height (arrow 1412), and 3) side-to-side motions of head 1402 relative to disk 1404 (arrow 1410). From diagram 1400, the insignificance of side-to-side head motions is clear because the uniform pattern of magnetic domains (all of which are much smaller than a written bit) has no structures (i.e., larger magnetized regions) which would cause noticeable changes (other than statistical noise) in the signal intensity. The signal from head 1402 in FIG. 14 will comprise all frequencies as shown in FIG. 13.

Figure 15:
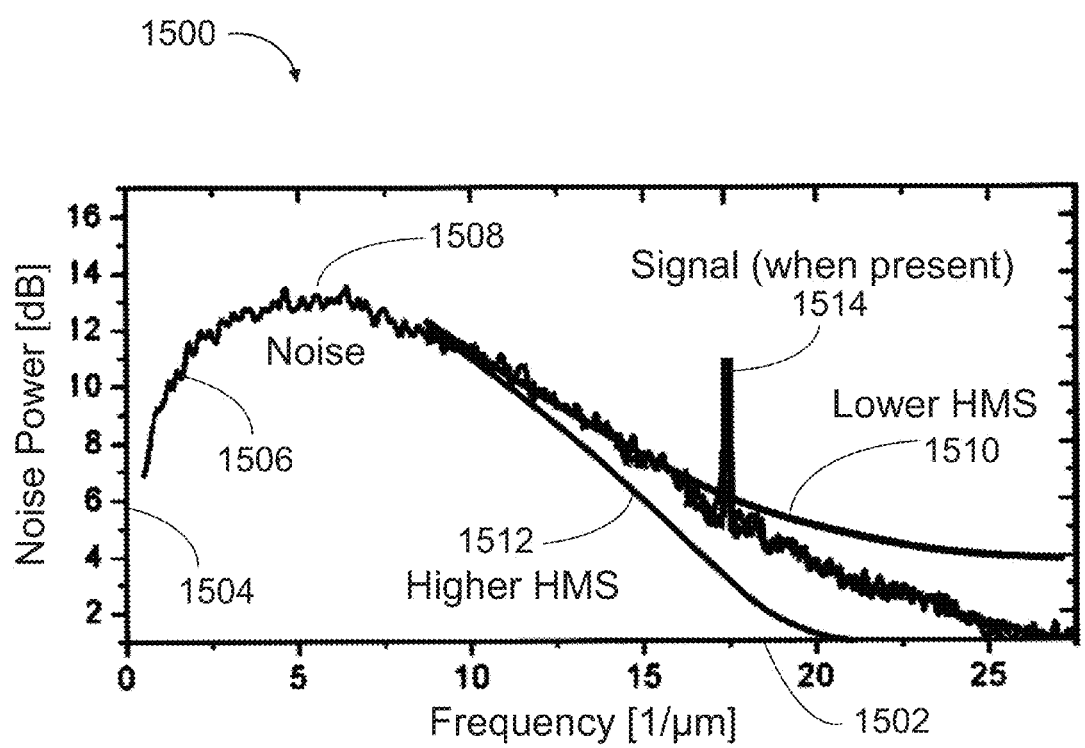
FIG. 15 is a graph of the noise power as a function of the spatial frequency on a region of a disk that is data-free.

FIG. 15 is a graph 1500 of the noise power 1504 as a function of the spatial frequency 1502—compare with FIGS. 2 and 11. Curve 1508 generally corresponds with curve 1108 in FIG. 11. Region 1506 corresponds to region 1106 in FIG. 11—the low frequency regime with increasing power for increasing frequencies. Signal peak 1514 (which is present when the disk has written data) corresponds to peak 1112 in FIG. 11. Comparing with FIG. 2, curves 1512 and 1510 correspond to curves 206 and 208, respectively—in both cases, there are no signal peaks. Thus, the noise spectrum from data-free regions may be used as a sensitive signal to detect variations in HMS, as can be seen from a comparison of curves 1512 and 1510, especially at higher spatial frequencies, for example above about 15 $\mu m^{-1}$ on this graph. We note that the Fast Fourier transform calculator 2116 will generate an output as a function of temporal frequencies. The conversion between temporal frequencies in the calculator 2116 and the corresponding spatial frequencies on the moving disk can be made using knowledge of the rotational speed of the disk and the radial position of the head. Precise determinations of variations in the signal strength at two different HMS values may be facilitated by normalizing the noise signal by another noise signal generated at another HMS value corresponding, for example, to no TFC power (see FIG. 19). Note that when the disk has prewritten data at single, dual or multiple frequencies, the power spectrum will show peaks that correspond to the frequencies in the written data. The magnitude of these specific peaks will also increase with decreasing HMS. A change in the peak values (of the single, dual or multiple frequencies) may be used to compute the HMS changes (by reading back at these specific written frequencies (FIG. 16, 17), however, normalizing the power spectrum at one HMS with that of the other over the entire range of frequencies (see FIG. 19) would generally eliminate these peaks, and this normalized data may be used to make HMS estimations as described here.

Figure 16:
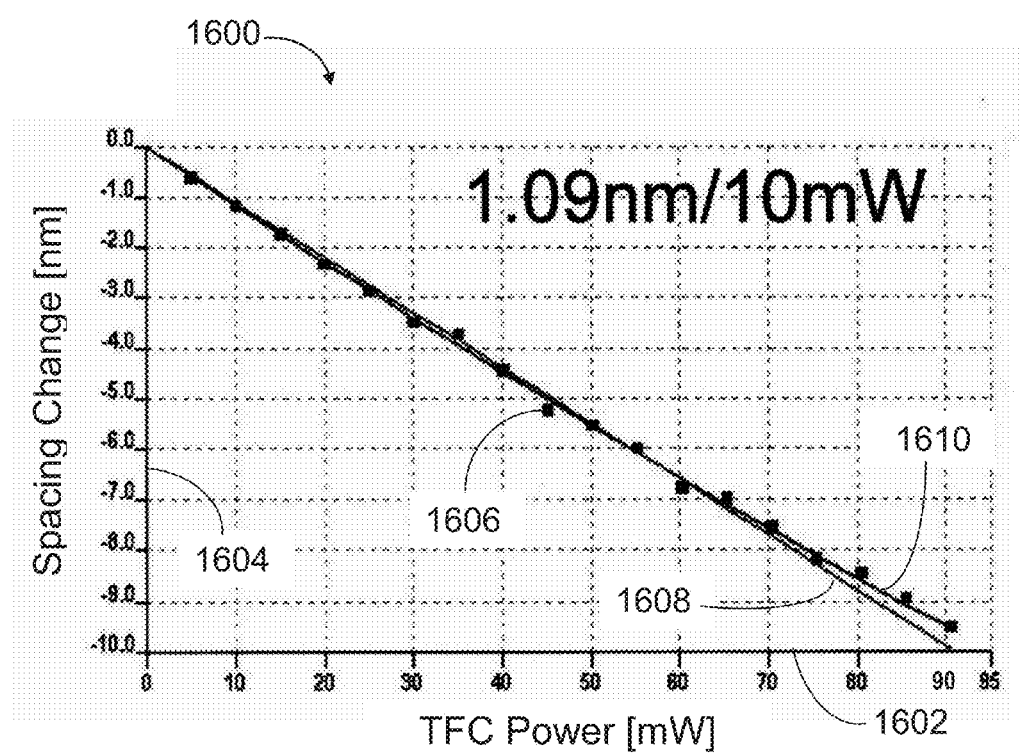
FIG. 16 is a graph of the head spacing change as a function of the thermal fly-height control power for a disk with perpendicular magnetic recording (PMR) data.

FIG. 16 is a graph 1600 of the head spacing change 1604 as a function of the thermal fly-height control (TFC) power 1602 for perpendicular magnetic recording (PMR) data written at only 140 MHz and then subsequently read-back also only at 140 MHz, while intentionally maintaining the head over the centerline of the written data track. Data points 1606 are seen to fall on an essentially straight line 1608 with a slope of 1.09 nm/10 mW. Curve 1610 is a quadratic function which is a marginally better fit to data points 1606 than straight line 1608.

Figure 17:
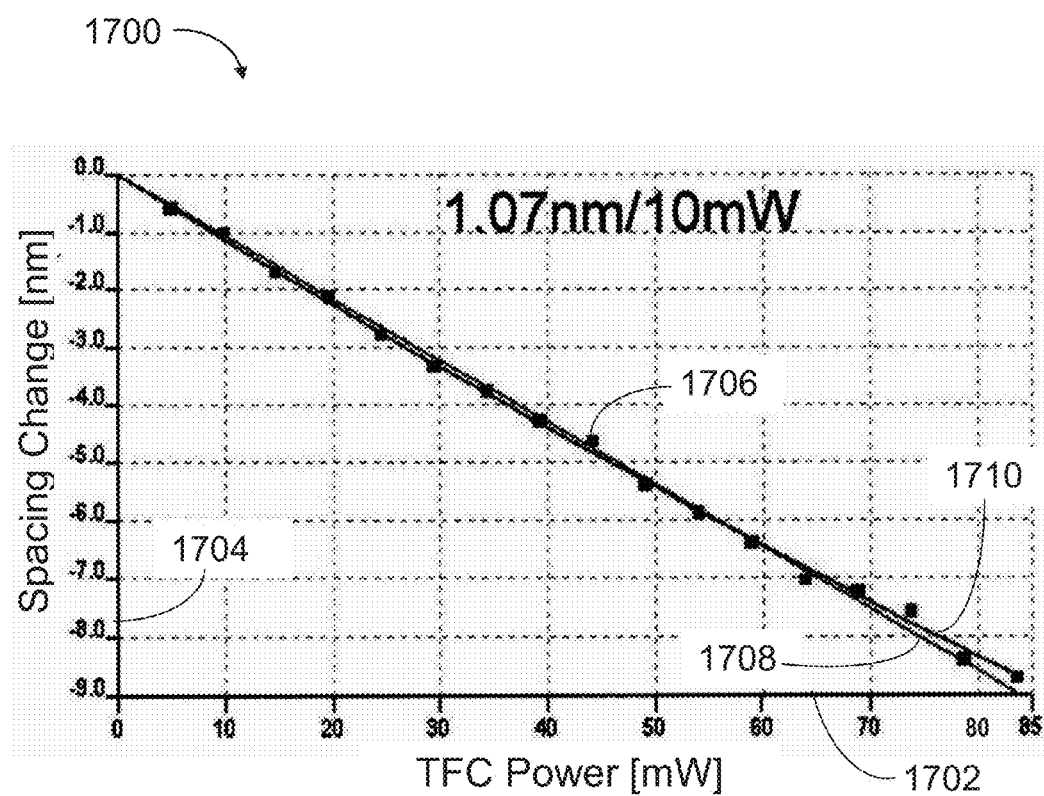
FIG. 17 is a graph of the head spacing change as a function of the thermal fly-height control power for a disk with thermally-assisted recorded (TAR) data.

FIG. 17 is a graph 1700 of the head spacing change 1704 as a function of the thermal fly-height control (TFC) power 1702 for thermally-assisted recorded (TAR) data written at only 140 MHz and then subsequently read-back also only at 140 MHz, while ensuring that the head remains on the centerline of the data track. Data points 1706 are seen to fall on an essentially straight line 1708 with a slope of 1.07 nm/10 mW. Curve 1710 is a quadratic function which is a marginally better fit to data points 1706 than straight line 1708.

Figure 18:
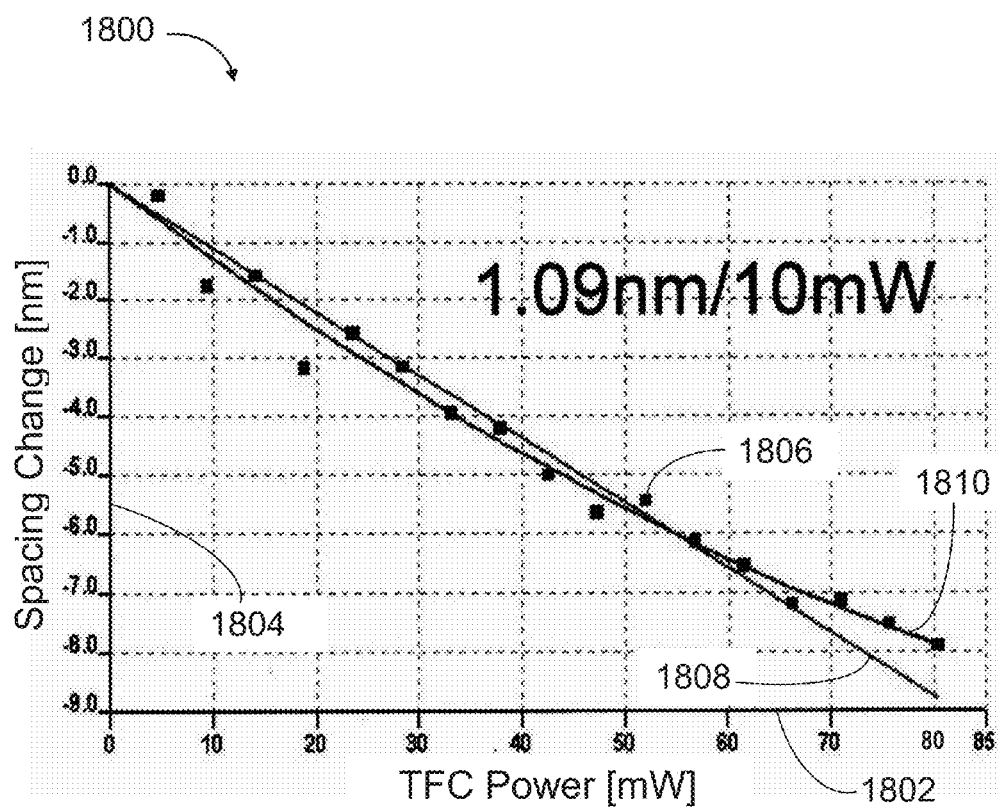
FIG. 18 is a graph of the head spacing change as a function of the thermal fly-height control power for a region of a data-free thermally-assisted recorded (TAR) disk.

FIG. 18 is a graph 1800 of the head spacing change 1804 as a function of the thermal fly-height control (TFC) power 1802 for a data-free region of a thermally-assisted recorded (TAR) disk. Data points 1806 exhibit more variation (statistical fluctuations) as a function of the TFC power than points 1606 or 1706 in FIGS. 16 and 17, respectively. Linear fit 1808 is not as good as quadratic fit 1810, especially at higher TFC powers. Note that these results are using a read-back signal at a single frequency (in this example, 140 MHz) and that these results could also be obtained with the use of multiple frequencies, or a complete power spectrum over all frequencies (typically generated using an FFT) as described by the method below in FIGS. 19 and 20. FIG. 18 demonstrates that even without a written signal, embodiments of the method provide a good TFC calibration of spacing change as a function of TFC power.

Figure 19:
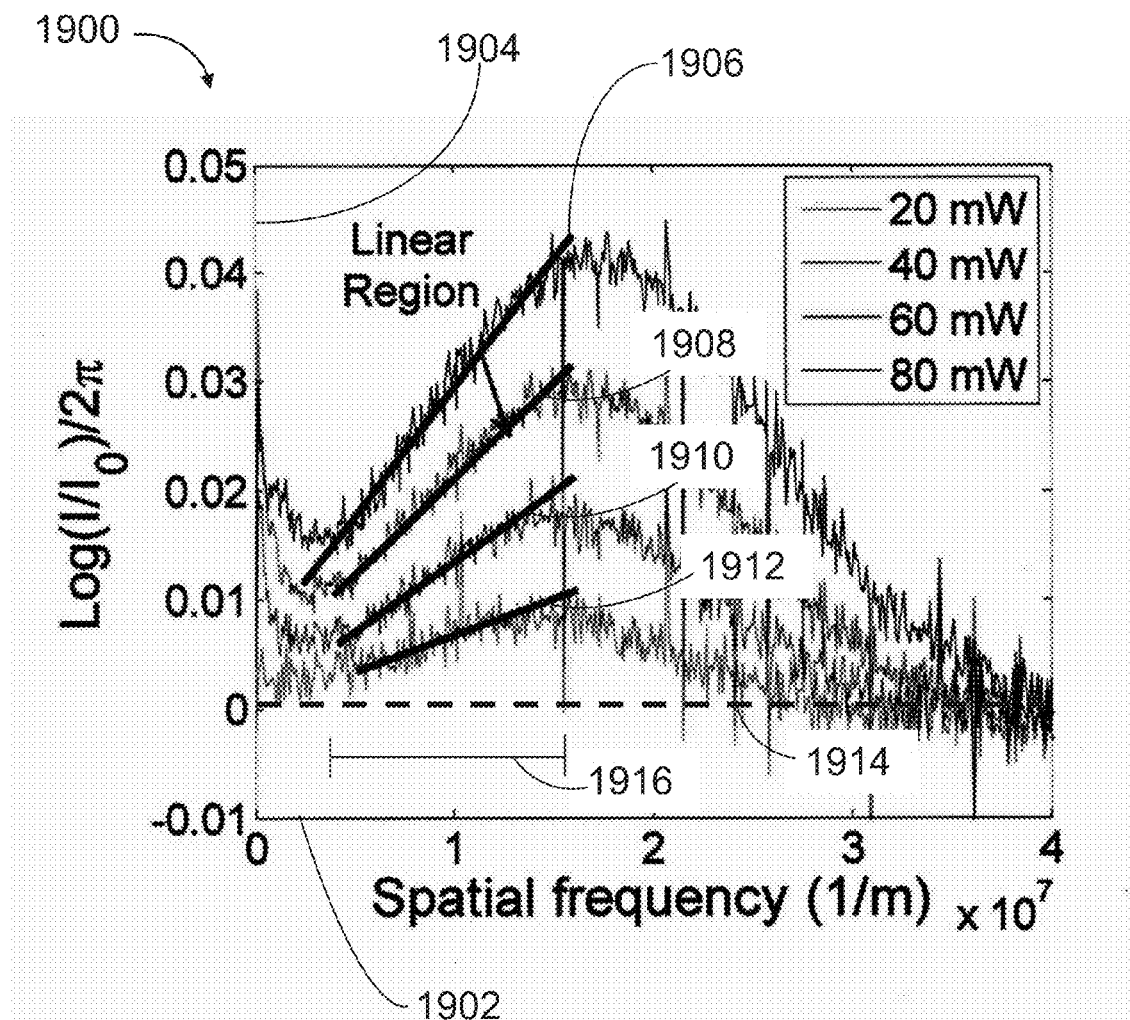
FIG. 19 is a graph of the logarithm of the normalized signal intensity relative to spatial frequency on a thermally-assisted recording (TAR) disk that is data-free.
Figure 20:
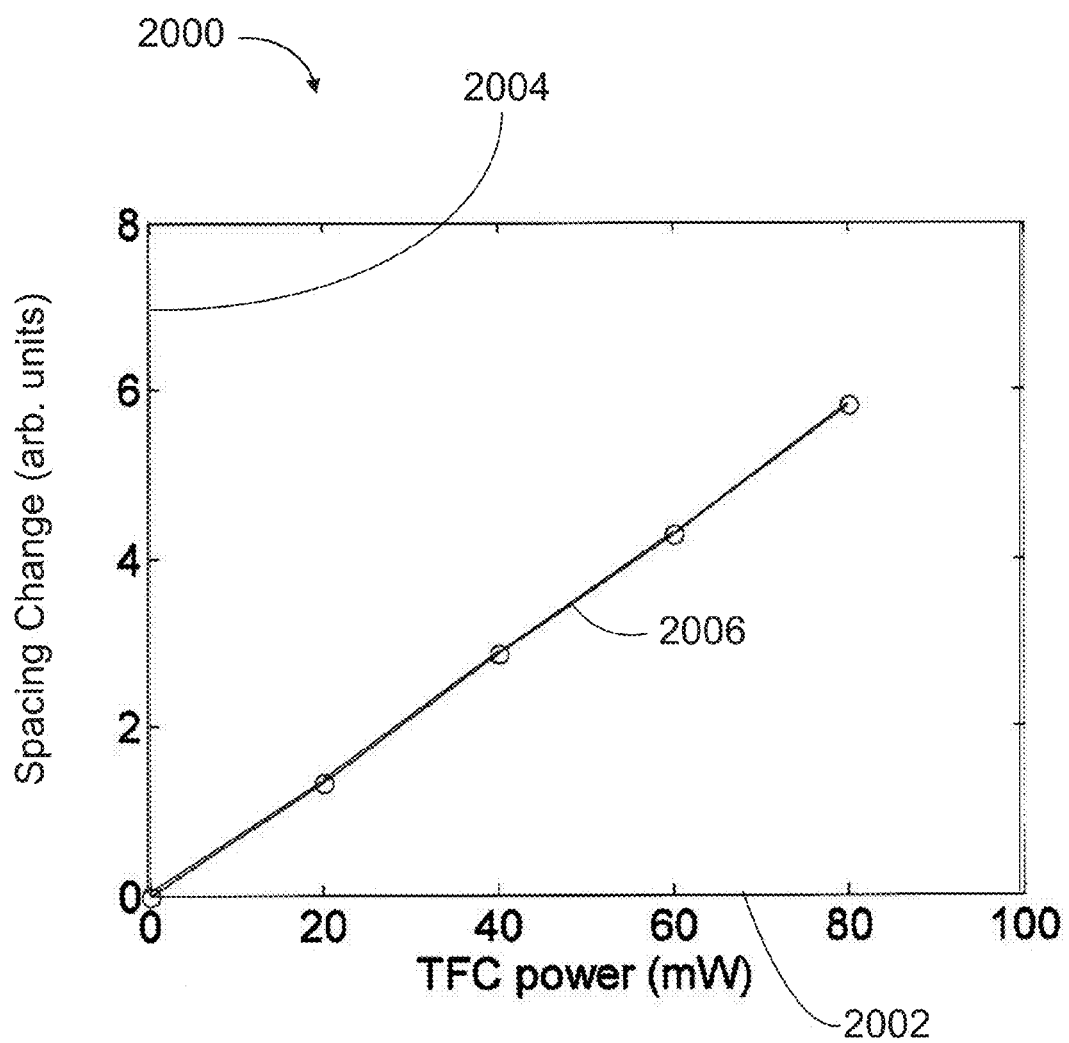
FIG. 20 is a graph of the head spacing change as a function of the thermal fly-height control power for a thermally-assisted recording (TAR) disk that is data-free.

Calculation of the Normalized Signal Graph and the Spacing Change with TFC Power FIG. 19 is a graph 1900 of the logarithm 1904 of the normalized signal intensity relative to spatial frequency 1902 on a thermally-assisted recording (TAR) disk, which is data-free. The normalization signal, $I_0$, is a reference signal that can be the measured Fourier transform of the readback signal at 0 mW TFC. However, Fourier transforms at other TFC powers could also be used for the reference signal, $I_0$. The Fourier Transform is performed on the data which was acquired in 1 ms, corresponding to 1/11 of a revolution of the disk rotating at about 5450 rpm and measured at a radius of 20.6 mm (the disk surface speed at this radius is around 12 m/s). In the "Wallace Range" 1916 (roughly $0.5 \times 10^7$ to $1.5 \times 10^7$ $m^{-1}$ for this example) the normalized signal is linear and the linear fits are shown for each of the four TFC powers 20, 40, 60, and 80 mW (lines 1912, 1910, 1908, and 1906, respectively). Dashed line 1914 represents the normalization line for 0 mW TFC power—curves 1906 to 1914 have been normalized by the reference data, so the data for 0 mW TFC power is essentially "normalized out" to give a straight dashed line. The exact limits on the range 1916 of the linear region can vary with different disk magnetic designs and read head designs. As such, range 1916 can be determined accordingly by similarly acquiring data for the different disk magnetic designs and read head designs and examining the range over which the data is linear. The data in FIG. 20 is obtained from the slopes of the four linear regions—this enables the TFC calibration to be obtained. In some embodiments, the signal data to construct FIG. 19 may be acquired while radially moving the read head across two or more neighboring overlapping tracks—this has the potential benefit of negating cross-track differences in the readback signal at a fixed radial position (see trajectories 640 and 740 in FIGS. 6 and 7, respectively). To obtain the various normalized curves, the "touch down method" may be used, as is known in the art. This method may typically comprise the following steps:

1) The thermal fly height control (TFC) power is set to 0 mW and a signal is acquired as a reference signal, $I_0$, for use in normalization of signals acquired with non-zero TFC powers. The Fourier transform of the reference signal also allows the Wallace range to be determined, such as range 1916 in FIG. 19.
2) The TFC power is then ramped up at a controlled rate until "touch down" of the read head with the rotating disk medium is detected by well-known methods. The TFC power at this point is recorded as $P_{TD}$.
3) From the design parameters of the read/write head and the heater, the rate of change of the head medium spacing (HMS) with respect to the TFC power $P_{TFC}$, (dHMS/$dP_{TFC}$), is approximately known. From this value, the fly height of the head in step 1) at a TFC of 0 mW may be approximated by [$P_{TD}$*(dHMS/$dP_{TFC}$)].
4) The TFC power may now be decreased from $P_{TD}$ systematically (causing the head to lift off of the rotating disk medium, i.e., clearance>0 nm), with signals recorded at various TFC powers from $P_{TD}$ down to zero. FIG. 19 illustrates this procedure for four powers 80, 60, 40, and 20 mW (where $P_{TD}$ is implicitly greater than 80 mW). At each of these TFC powers, the Fourier transform of the readback signal is normalized by the Fourier transform of the reference signal $I_0$, and the slope of the normalized signal is calculated over the Wallace range which was determined in step 1). From equation 2 and the discussion of FIG. 2, the slope in FIG. 19 is then equal to −Δh, which, in other words, is the change in the fly-height or HMS from the reference fly-height or HMS at 0 mW TFC power (where the 2π factor has been divided out as shown in the vertical axis label in FIG. 19).

5) FIG. 20 can then be generated from the slopes of the normalized signals in FIG. 19 corresponding to each TFC power.

FIG. 20 is a graph 2000 of the head spacing change 2004 as a function of the thermal fly-height control power 2002 for a region on a thermally-assisted recording (TAR) disk which is data-free. The four data points on line 2006 correspond to the four heater powers 20, 40, 60, and 80 mW in FIG. 19 over the linear Wallace range 1908. The slopes of the four straight lines 1906-1912 in FIG. 19 provide the spacing change data in FIG. 20. The slope of a linear 2006 fit through these five points (including a fifth point at 0 mW TFC power) gives the TFC calibration between TFC power and spacing change (nm/mW). The vertical axis is in arbitrary units since actual values will vary with the hard disk design.

Data Storage System Embodiments

Figure 21:
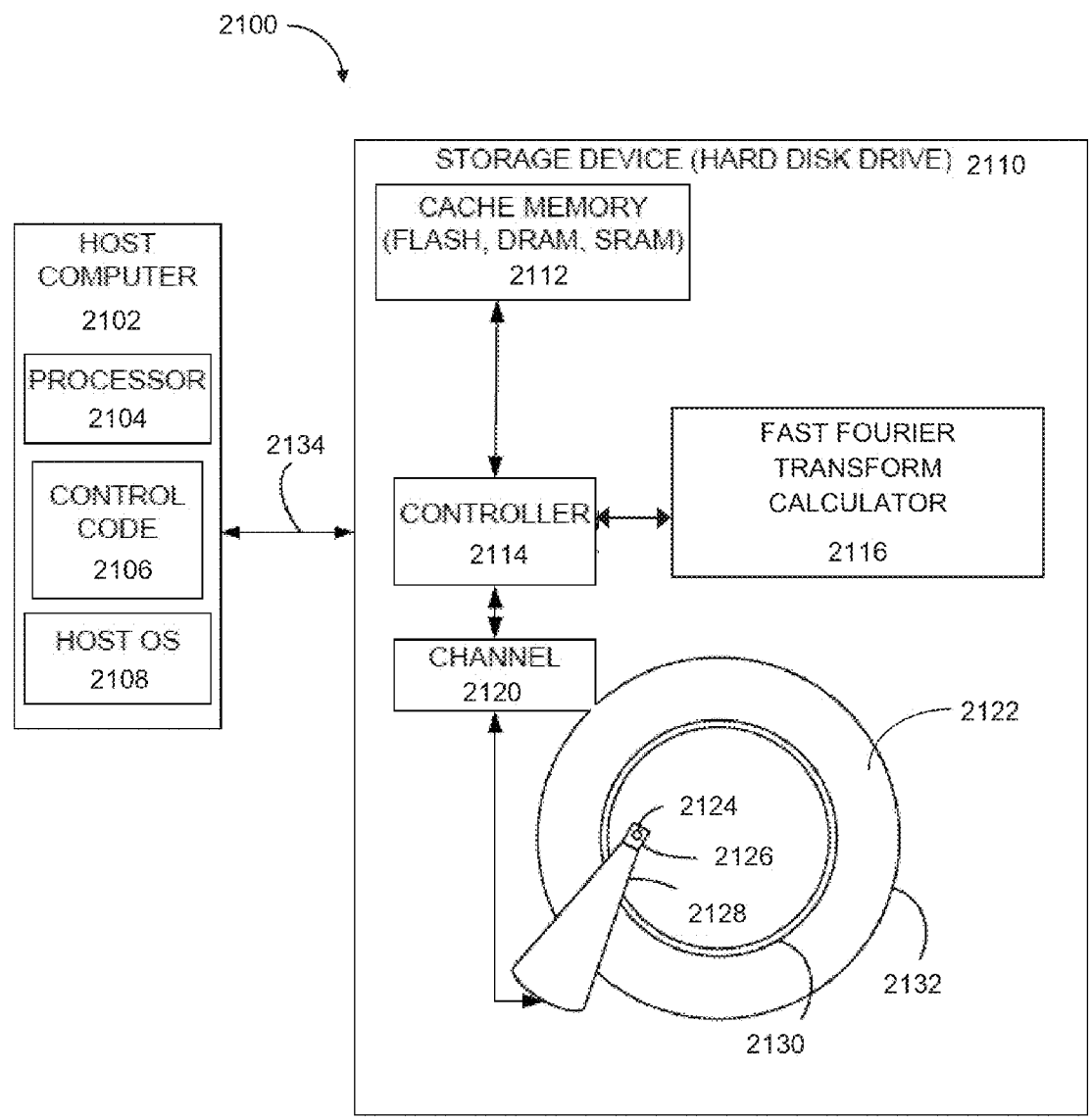
FIG. 21 is a schematic diagram of a hard disk drive according to some embodiments.

FIG. 21 is a schematic diagram of a data storage system 2100 according to some embodiments. System 2100 includes a host computer 2102, a storage device such as a hard disk drive 2110, and an interface 2134 between the host computer 2102 and the storage device 2110. Host computer 2102 includes a processor 2104, a host operating system 2108, and control code 2106. The storage device or hard disk drive 2110 includes a controller 2114 coupled to a data channel 2120. Hard disk drive 2110 includes an arm 2128 carrying a read/write head including a read/write element 2124, and a heater 2126.

In operation, host operating system 2108 in host computer 2102 sends commands to hard disk drive 2110. In response to these commands, hard disk drive 2110 performs requested functions such as reading, writing, and erasing data, on disk surface 2122. Controller circuit 2114 causes write element 2124 to record magnetic patterns of data on a writable surface of disk 2122 in tracks 2130. The controller circuit 2114 positions the read/write head 2124 over the recordable or writable surface 2122 of a disk 2132 by locking a servo loop to pre-determined servo positioning burst patterns, typically located in a servo spokes or zones. Controller 2114 also regulates the TFC current to heater 2126 to control the HMS. It is noted that in the absence of the servo burst patterns, or in case of a 'data-free' disk, the controller will be unable to precisely position the head over a desired track (or radial position), leaving larger than expected side-to-side motions of the head, and it is under these conditions that the implementation of fly-height measurement proposed in this embodiment becomes beneficial.

In accordance with some embodiments, system 2100 includes a cache memory 2112, for example, implemented with one or a more of: a flash memory, a dynamic random access memory (DRAM) and a static random access memory (SRAM). A hardware Fast Fourier Transform (FFT) calculator 2116 may (optionally) be utilized to perform FFT power spectrum calculations typically faster than a software or firmware FFT calculation.

System 2100, including the host computer 2102 and the storage device or hard disk drive 2110 is shown in simplified form sufficient for understanding this embodiment. The illustrated host computer 2102 together with the storage device or hard disk drive 2110 is not intended to imply architectural or functional limitations. These embodiments can be used with various hardware implementations and systems and various other internal hardware devices.

Figure 22:
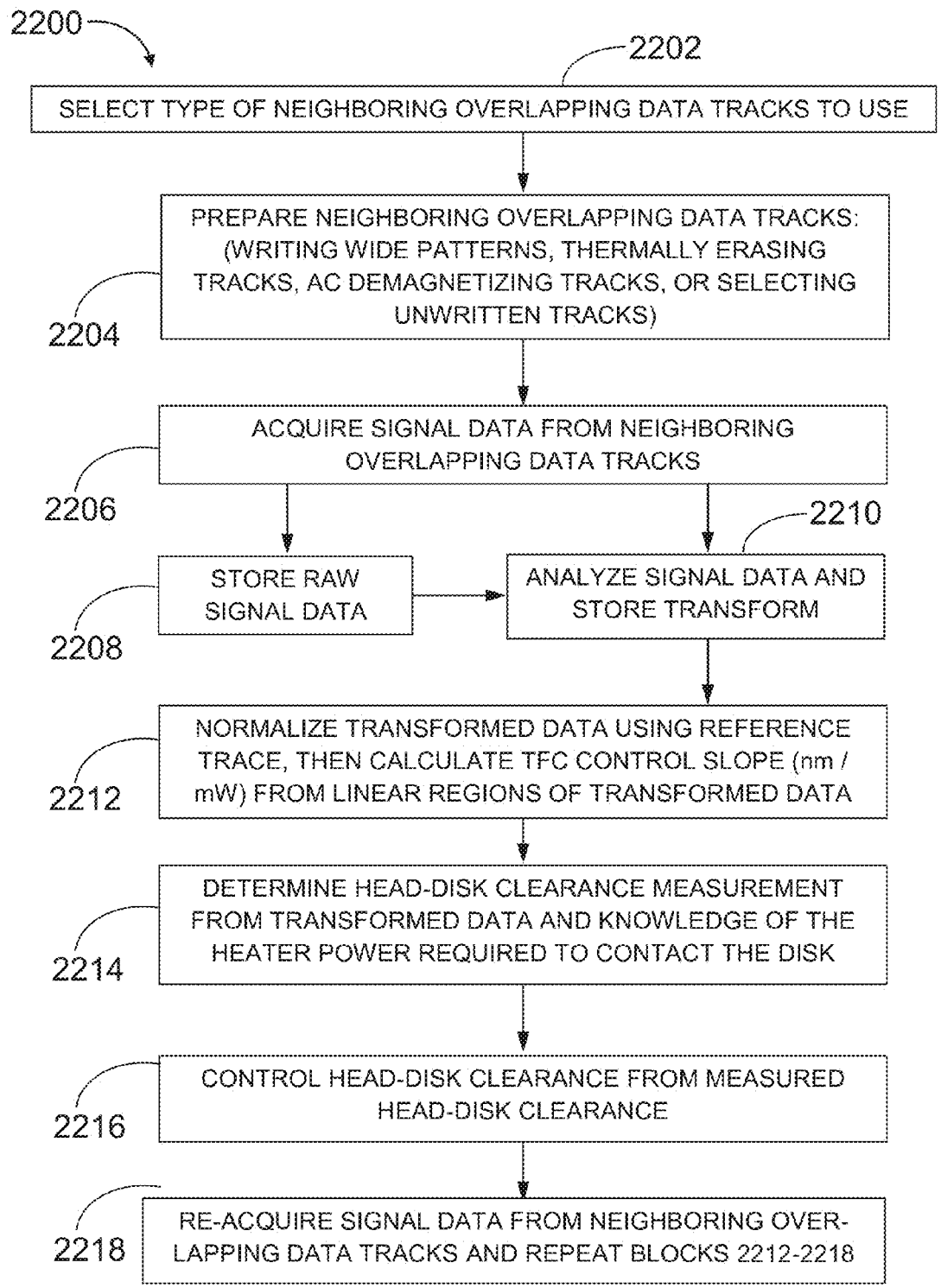
FIG. 22 is a flow chart of a method for measuring variations in fly height in accordance with some embodiments.

Flowchart of a Method for Dynamic Fly Height Control that is Insensitive to Off-Track Motions of the Read Head FIG. 22 is a flow chart 2200 of a method for measuring variations in fly height in accordance with some embodiments.

In block 2202, the type of neighboring overlapping data tracks to use for the fly height control method is chosen. In some embodiments, neighboring overlapping tracks with reference data comprising single, dual, or multiple frequencies may be chosen. In other embodiments, data-free neighboring overlapping data tracks may be chosen. Various methods for generating or selecting data-free tracks are discussed in the text for FIG. 7.

In block 2204, the neighboring overlapping data tracks as selected in block 2202 are either prepared or selected.

In block 2206, the read head moves (in a seek operation) to the data tracks selected in block 2204, and then acquires signal data from the data tracks.

Next, two alternative blocks may be entered from block 2206: first enter block 2208 to directly store the raw (un-analyzed) signal data and then enter block 2210, or immediately enter block 2210 to analyze the signal data (typically with a Fourier transform) and then store the transform data.

In block 2212, the stored transformed data from block 2210 is normalized as discussed in FIG. 19. The TFC control slope (nm/mW) is calculated from linear regions of the transformed data by repeating the operation in block 2206 to 2210 in succession for different TFC powers.

Block 2214 then determines the head-disk clearance from the transformed data at a given TFC power, combined with knowledge of the heater power, $P_{TD}$ (see FIG. 19), used for "touch down" of the head with the rotation disk medium.

In block, 2216, the head-disk clearance is controlled to the selected clearance using the data from block 2214 and the calibration [nm/mW] computed in block 2212.

In block 2218, signal data is re-acquired from the same neighboring overlapping data tracks as in block 2206 and the method outlined in blocks 2206-2218 is repeated whenever the disk medium rotation is restarted, or periodically at pre-determined time intervals, or whenever a noticeable change (stronger or weaker) in the signal intensity is detected (possibly indicating a change in the operating condition of the read/head with respect to the disk).

Alternative Embodiments

Although embodiments have been described in the context of hard disk drives, it should be understood that various changes, substitutions and alterations can be made herein without departing from the spirit and scope of the invention as defined by the appended claims. Moreover, the scope of the present application is not intended to be limited to the particular embodiments of the process, machine, manufacture, or composition of matter, means, methods and steps described in the specification. As one of ordinary skill in the art will readily appreciate from the disclosure of embodiments, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

For example, other embodiments may include a disk drive system comprising at least one magnetic disk and a read and write head assembly having a read head that reads data from the at least one magnetic disk, a write head that writes data to the at least one magnetic disk, and a heater for manipulating a spacing between the read and write head and the at least one magnetic disk. In addition, a controller may be employed that selects a region of the at least one magnetic disk for the purpose of fly height measurement, wherein the selected region comprises a type selected from the group consisting of a data-free region and pre-written reference data, the read head reads signal intensity information from the selected region, and the controller analyzes the signal intensity information to obtain a measurement of the spacing between the read and write head and the at least one magnetic disk.

Embodiments of the pre-written reference data may comprise single, dual, or multiple frequencies, and wherein the selected region comprises neighboring overlapping data tracks. The data-free region may be an unwritten region of the at least one magnetic disk, and the selected region comprises neighboring overlapping data tracks. The data-free region may be a thermally-erased or AC demagnetized region of the at least one magnetic disk, and the selected region may comprise neighboring overlapping data tracks.

The controller also may control the spacing between the read and write head and the at least one magnetic disk based on the measurement of the spacing between the read and write head and the at least one magnetic disk, and control of the spacing between the read and write head and the at least one magnetic disk may be effected by the heater. Analysis of the read signal intensity information may comprise a spectrum analysis of the signal intensity information. The spectrum analysis may comprise a Fourier Transform operation, and wherein the output from the Fourier Transform operation may be normalized by the Fourier transform of a reference read output signal. The slope of the normalized Fourier Transform with respect to signal frequency may be used to measure the clearance between the read and write head and the at least one magnetic disk. The slope may be determined over a subrange of the full frequency range of the Fourier Transform in which the Fourier transform signal is linear.

Embodiments of the disk drive system may further comprise a plurality of read and write head assemblies, each of the plurality of read and write head assemblies having a read head that reads data from the at least one magnetic disk, a write head that writes data to the at least one magnetic disk, and a heater that manipulates a spacing between the read and write head and the at least one magnetic disk; and a controller that selects a plurality of regions of the at least one magnetic disk, wherein each region in the plurality of regions is read by at least one of the plurality of read and write head assemblies, each region in the plurality of regions can be selected for the purpose of fly height measurement; each region in the plurality of regions is a type selected from the group consisting of a data-free region and pre-written reference data, said at least one of the plurality of read and write head assemblies reads signal intensity information from each of the selected regions; and the controller analyzes the signal intensity information corresponding to each region of the plurality of regions to obtain measurements of clearance of each of the read and write heads in the plurality of read and write head assemblies over the at least one magnetic disk, and the controller controls spacings of the read and write heads and the at least one magnetic disk based on the measurements of the spacings between the read and write heads and the at least one magnetic disk, and wherein control of the spacings between the read and write heads and the at least one magnetic disk is effected by the heaters.

In still another embodiment, a method for measuring variations in the head-disk clearance in a hard disk drive may comprise selecting regions of the disk comprising neighboring overlapping data tracks, wherein the neighboring data tracks comprise either pre-written reference data, or are data-free; reading signal intensity information from each selected region; and performing a spectrum analysis of the signal intensity information to obtain a measurement of the clearance between the read and write head and the disk.

The method may further comprise controlling of the clearance between the read and write head and the disk based on the measurement of the clearance between the read and write head and the disk. The spectrum analysis may comprise a Fourier Transform operation, and further comprising normalizing the output from the Fourier Transform operation by the Fourier transform of a reference read output signal.

The method may still further comprise measuring the clearance between the read and write head and the at least one magnetic disk using the slope of the normalized Fourier Transform with respect to signal frequency, wherein the slope is determined over a subrange of the full frequency range of the Fourier Transform in which the Fourier transform signal is linear. The method also may further comprise re-reading the signal intensity information, and re-analyzing the signal intensity information to obtain a re-measurement of the clearance of the read and write head over the disk.

Embodiments of re-reading the signal intensity information, and re-analyzing the signal intensity information may be repeated as desired during operation of the hard disk drive. The repetition of re-analyzing signal intensity information may occur whenever rotation of the disk medium is restarted, or periodically at pre-determined time intervals, or whenever a substantial change in the read signal intensity occurs. The reading signal intensity information may comprise reading signal intensity information from two or more of the neighboring overlapping data tracks.

The invention claimed is:

1. A disk drive system comprising: at least one magnetic disk; a read and write head assembly having a read head that reads data from the at least one magnetic disk, a write head that writes data to the at least one magnetic disk, and a heater for manipulating a spacing between the read and write head and the at least one magnetic disk; and a controller that selects a region of the at least one magnetic disk for the purpose of fly height measurement, wherein the selected region comprises a type selected from the group consisting of a data-free region and pre-written reference data, wherein the selected region comprises neighboring overlapping data tracks, the read head reads signal intensity information from the selected region, and the controller analyzes the signal intensity information to obtain a measurement of the spacing between the read and write head and the at least one magnetic disk.

2. The disk drive system of claim 1, wherein the pre-written reference data comprises single, dual, or multiple frequencies.

3. The disk drive system of claim 1, wherein the data-free region is an unwritten region of the at least one magnetic disk.

4. The disk drive system of claim 1, wherein the data-free region is a thermally-erased or AC demagnetized region of the at least one magnetic disk.

5. The disk drive system of claim 1, wherein the controller also controls the spacing between the read and write head and the at least one magnetic disk based on the measurement of the spacing between the read and write head and the at least one magnetic disk, and control of the spacing between the read and write head and the at least one magnetic disk is effected by the heater.

6. The disk drive system of claim 1, wherein the analysis of the read signal intensity information comprises a spectrum analysis of the signal intensity information.

7. The disk drive system of claim 6, wherein the spectrum analysis comprises a Fourier Transform operation, and wherein the output from the Fourier Transform operation is normalized by the Fourier transform of a reference read output signal.

8. The disk drive system of claim 7, wherein the slope of the normalized Fourier Transform with respect to signal frequency is used to measure the clearance between the read and write head and the at least one magnetic disk.

9. The disk drive system of claim 8, wherein the slope is determined over a subrange of the full frequency range of the Fourier Transform in which the Fourier transform signal is linear.

10. The disk drive system of claim 1, further comprising:
a plurality of read and write head assemblies, each of the plurality of read and write head assemblies having a read head that reads data from the at least one magnetic disk, a write head that writes data to the at least one magnetic disk, and a heater that manipulates a spacing between the read and write head and the at least one magnetic disk; and
a controller that selects a plurality of regions of the at least one magnetic disk, wherein each region in the plurality of regions is read by at least one of the plurality of read and write head assemblies, each region in the plurality of regions can be selected for the purpose of fly height measurement; each region in the plurality of regions is a type selected from the group consisting of a data-free region and pre-written reference data, said at least one of the plurality of read and write head assemblies reads signal intensity information from each of the selected regions; and the controller analyzes the signal intensity information corresponding to each region of the plurality of regions to obtain measurements of clearance of each of the read and write heads in the plurality of read and write head assemblies over the at least one magnetic disk, and the controller controls spacings of the read and write heads and the at least one magnetic disk based on the measurements of the spacings between the read and write heads and the at least one magnetic disk, and wherein control of the spacings between the read and write heads and the at least one magnetic disk is effected by the heaters.

11. The disk drive system of claim 10, wherein each analysis comprises a spectrum analysis of the signal intensity information from the corresponding selected region.

12. The disk drive system of claim 11, wherein each spectrum analysis comprises a Fourier Transform operation, and wherein the output from each Fourier Transform operation is normalized by the Fourier transform of a reference read output signal.

13. The disk drive system of claim 12, wherein the slope of each normalized Fourier Transform with respect to signal frequency is used to measure the clearance between the corresponding read and write head and the at least one magnetic disk.

14. The disk drive system of claim 13, wherein the slope of each normalized Fourier Transform is determined over a subrange of the full frequency range of the Fourier Transform in which the Fourier transform signal is linear.

15. A method for measuring variations in the head-disk clearance in a hard disk drive, comprising:
selecting regions of the disk comprising neighboring overlapping data tracks, wherein the neighboring data tracks comprise either pre-written reference data, or are data-free;
reading signal intensity information from each selected region;
performing a spectrum analysis of the signal intensity information to obtain a measurement of the clearance between the read and write head and the disk.

16. The method of claim 15, further comprising controlling of the clearance between the read and write head and the disk based on the measurement of the clearance between the read and write head and the disk.

17. The method of claim 15, wherein the spectrum analysis comprises a Fourier Transform operation, and further comprising normalizing the output from the Fourier Transform operation by the Fourier transform of a reference read output signal.

18. The method of claim 17, further comprising measuring the clearance between the read and write head and the at least one magnetic disk using the slope of the normalized Fourier Transform with respect to signal frequency, wherein the slope is determined over a subrange of the full frequency range of the Fourier Transform in which the Fourier transform signal is linear.

19. The method of claim 18, further comprising re-reading the signal intensity information, and re-analyzing the signal intensity information to obtain a re-measurement of the clearance of the read and write head over the disk.

20. The method of claim 19, wherein the re-reading the signal intensity information, and the re-analyzing the signal intensity information are repeated as desired during operation of the hard disk drive.

21. The method of claim 20, wherein the repetition of re-analyzing signal intensity information occurs whenever rotation of the disk medium is restarted, or periodically at pre-determined time intervals, or whenever a substantial change in the read signal intensity occurs.

22. The method of claim 15, wherein the reading signal intensity information comprises reading signal intensity information from two or more of the neighboring overlapping data tracks.

* * * * *